(12) United States Patent
Funabiki et al.

(10) Patent No.: US 8,675,682 B2
(45) Date of Patent: Mar. 18, 2014

(54) WIRELESS COMMUNICATION DEVICE FOR PROCESSING PACKET INCLUDING AT LEAST ONE OF VIDEO OUTPUT FORMAT OF VIDEO DATA AND AUDIO OUTPUT FORMAT OF AUDIO DATA

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 12/934,353

(22) PCT Filed: Mar. 26, 2009

(86) PCT No.: PCT/JP2009/001355
§ 371 (c)(1),
(2), (4) Date: Sep. 24, 2010

(87) PCT Pub. No.: WO2009/119095
PCT Pub. Date: Oct. 1, 2009

(65) Prior Publication Data
US 2011/0019623 A1 Jan. 27, 2011

(30) Foreign Application Priority Data
Mar. 27, 2008 (JP) .................................. 2008-082791

(51) Int. Cl.
*H04N 5/775* (2006.01)
*H04W 4/18* (2009.01)
*H04W 12/08* (2009.01)
*H04W 84/18* (2009.01)

(52) U.S. Cl.
USPC ............ 370/468; 370/463; 370/310; 370/329

(58) Field of Classification Search
None
See application file for complete search history.

(56) References Cited

U.S. PATENT DOCUMENTS 7,378,984 B2 * 5/2008 Suzuki et al. ............... 340/12.51
7,849,218 B2 * 12/2010 Funabiki et al. .............. 709/245

(Continued)

FOREIGN PATENT DOCUMENTS

| JP | 2004-208290 | 7/2004 |
| JP | 2007-235370 | 9/2007 |
| WO | 2007/091706 | 8/2007 |
| WO | 2007/136037 | 11/2007 |
| WO | 2007/136038 | 11/2007 |

OTHER PUBLICATIONS

International Preliminary Report on Patentability and Written Opinion of the International Searching Authority with English translation issued Oct. 7, 2010 in corresponding International Application No. PCT/JP2009/001355.

(Continued)

*Primary Examiner* — Asad Nawaz
*Assistant Examiner* — Jason Harley
(74) *Attorney, Agent, or Firm* — Wenderoth, Lind & Ponack, L.L.P.

(57) ABSTRACT

A wireless node device receives data island packets from an HDMI device with a time cycle, and prohibits wireless transmission of a data island notification message when a video output format and an audio output format included in the data island packet are the same as a video output format and an audio output format included in the data island packet, respectively.

6 Claims, 27 Drawing Sheets

(56) References Cited

U.S. PATENT DOCUMENTS

| | | | |
|---|---|---|---|
| 8,214,726 B2* | 7/2012 | Funabiki et al. | 714/786 |
| 2002/0085531 A1* | 7/2002 | Herrmann et al. | 370/338 |
| 2004/0143847 A1* | 7/2004 | Suzuki et al. | 725/61 |
| 2006/0209892 A1* | 9/2006 | MacMullan et al. | 370/468 |
| 2008/0172708 A1* | 7/2008 | Perry et al. | 725/110 |
| 2009/0138779 A1 | 5/2009 | Funabiki et al. | |
| 2009/0210539 A1 | 8/2009 | Funabiki et al. | |
| 2010/0165912 A1 | 7/2010 | Funabiki et al. | |
| 2010/0220669 A1* | 9/2010 | Jeon et al. | 370/329 |

OTHER PUBLICATIONS

International Search Report issued May 26, 2009 in International (PCT) Application No. PCT/JP2009/001355.

High-Definition Multimedia Interface Specification, Version 1.3a, HDMI Licensing, LLC, California in U.S.A, Nov. 10, 2006.

\* cited by examiner

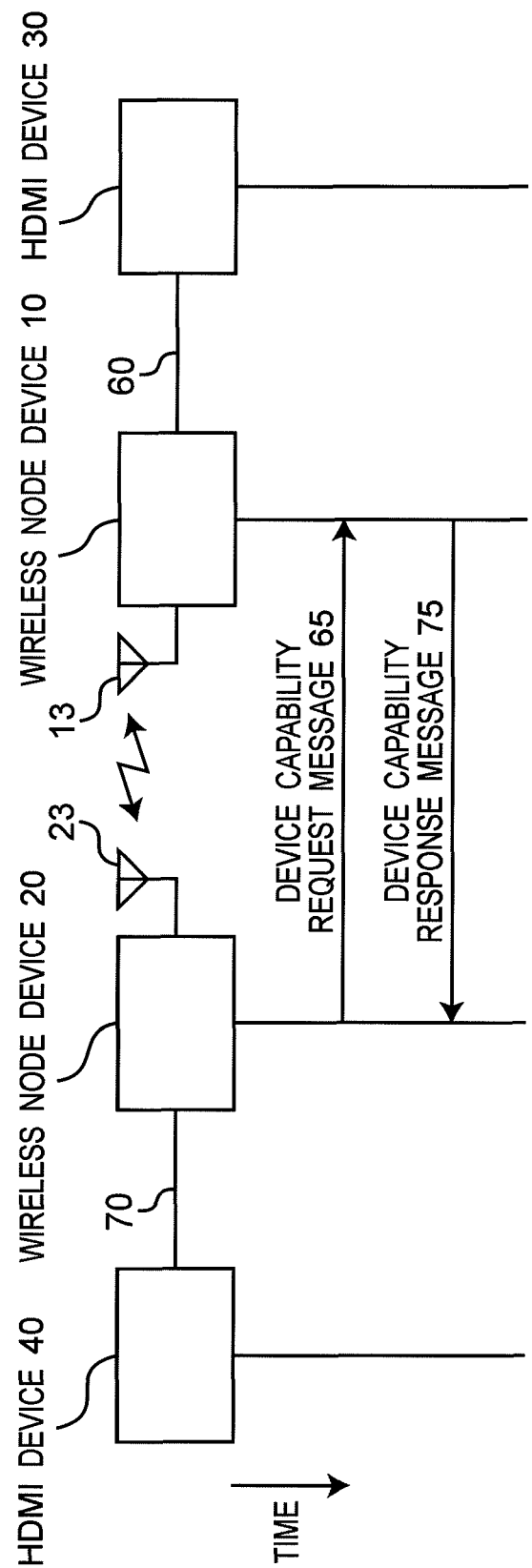

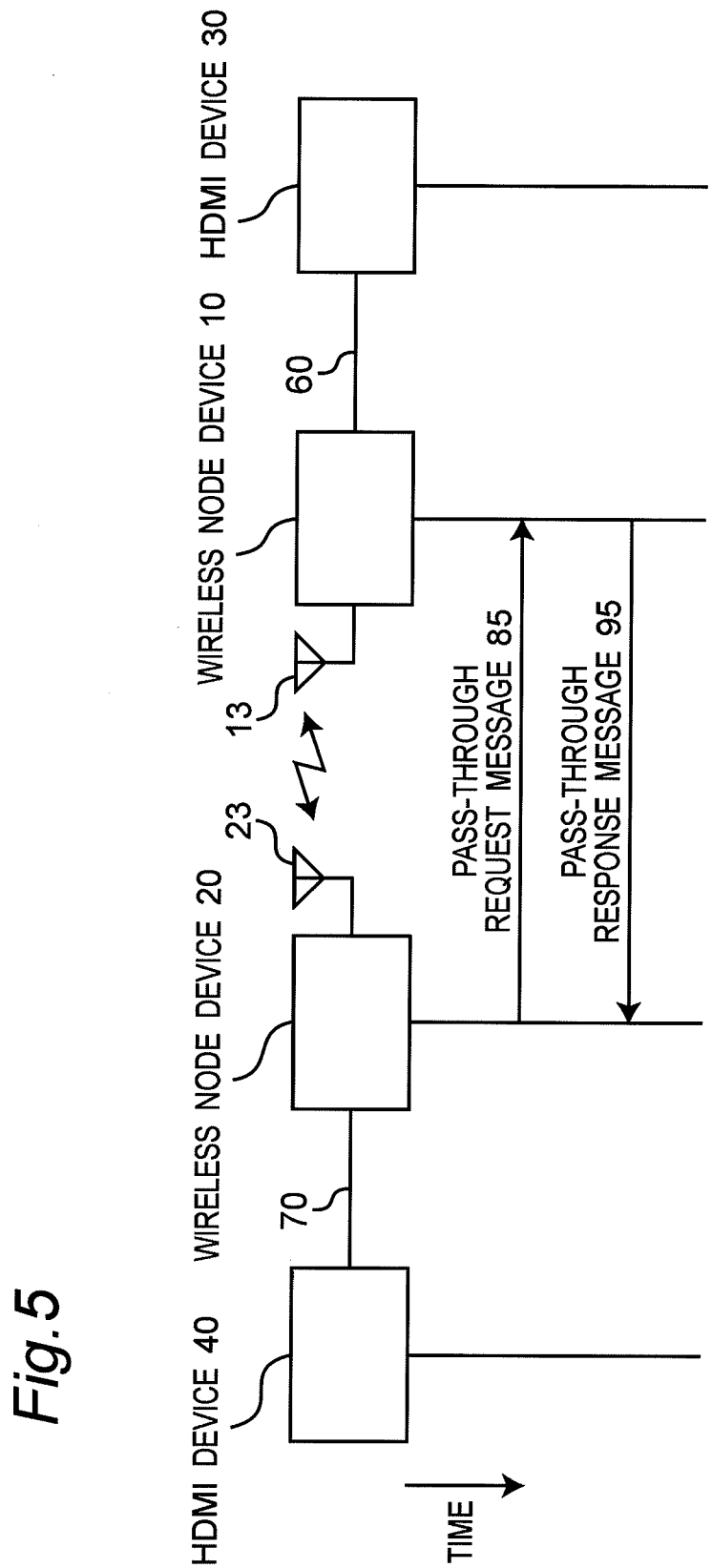

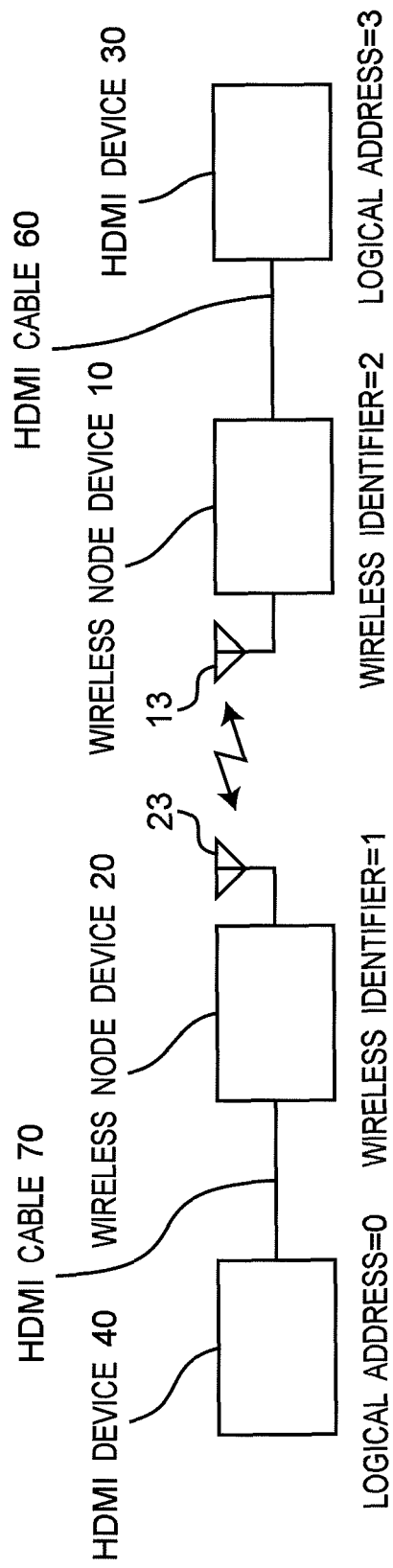

Fig.6D

DEVICE INFORMATION TABLE 14t

| WIRELESS IDENTIFIER | LOGICAL ADDRESS | WIRE CONNECTION FLAG |
|---|---|---|
| 1 | 0 | 0 |
| 2 | 3 | 1 |

Fig.6E

DEVICE INFORMATION TABLE 24t

| WIRELESS IDENTIFIER | LOGICAL ADDRESS | WIRE CONNECTION FLAG |
|---|---|---|
| 1 | 0 | 1 |
| 2 | 3 | 0 |

WIRELESS COMMUNICATION DEVICE FOR PROCESSING PACKET INCLUDING AT LEAST ONE OF VIDEO OUTPUT FORMAT OF VIDEO DATA AND AUDIO OUTPUT FORMAT OF AUDIO DATA

TECHNICAL FIELD

The present invention relates to a wireless communication device. In particular, the present invention relates to a wireless communication device for converting signals transmitted among a plurality of AV (Audio and Visual) devices into wireless signals, and transmitting the wireless signals, where an HDMI (High-Definition Multimedia Interface) interface is implemented to each of the AV devices.

BACKGROUND ART

As a system according to a prior art for transmitting video and audio data among a plurality of node devices, there has been known a system which uses an HDMI specified in Non-Patent Document 1. In the HDMI system, a node device (for example, an audio and visual reproducing device such as a DVD (Digital Versatile Disk) player) at a transmitter side for transmitting the video and audio data reads EDID (Extended Display Identification Data) of a node device (for example, a TV) at a receiver side via a DDC (Display Data Channel) so as to acquire required format information. This format information includes video output formats (video output specifications) and audio output formats (audio output specifications) that the node device at the receiver side supports. The node device at the transmitter side determines output formats of data to be transmitted based on the acquired format information. Information on a decided video output format is multiplexed with the video data, and transmitted to the node device at the receiver side.

When a user presses a Play button of the node device at the transmitter side, the node device at the transmitter side transmits an Active Source message to the node device at the receiver side. In response to this, input-switching is done at the node device at the receiver side, and the node device at the receiver side can display pictures reproduced by the node device at the transmitter side instantly.

In addition, Patent Document 1 discloses an AV system configured to include a display device, a plurality of video devices connected to the display device, and remote controllers for controlling the video devices, respectively. In the AV system, it is possible to operate the respective video devices with the remote controls to the display. Each of the remote controllers transmits a remote control code including at least one of a manufacturer code corresponding to the remote controller and a device code, to the display device in response to hold down of an operation button of the remote controller. Based on the remote control code transmitted by the remote controller, the display device connects a video device corresponding to the remote controller which transmitted the remote control code among the plural video devices, to a display unit, and the input switching for the display device is done.

Japanese patent laid-open publication No. JP-2004-208290-A.

Non-Patent Document 1: High-Definition Multimedia Interface Specification, Version 1.3a, HDMI Licensing, LLC, California in U.S.A, Nov. 10, 2006.

DISCLOSURE OF INVENTION

Technical Problem

However, when video and audio data transmitted among a plurality of AV devices, to each of which an HDMI interface is implemented, are converted into wireless signals and the wireless signals are transmitted, it is required to wirelessly transmit additional information, control data and the like for transmitting the video and audio data. Therefore, there is such a problem that it is required to reduce consumption of a transmission band due to the requirements for wireless transmission of the additional information, the control data and the like, and it is required to reduce delay caused by the wireless transmission.

It is an object of the present invention to provide a wireless communication method, a wireless communication device and a wireless communication system each capable of solving the problems according to the prior art, and capable of allowing flexible arrangement of the AV devices by converting the video and audio data transmitted among the AV devices into wireless signals and transmitting the wireless signals efficiently as compared with the prior art.

Solution to Problem

According to the first aspect of the present invention, there is provided a wireless communication device for receiving a content signal from at least one wire transmitter device via a wire transmission line and wirelessly transmitting the content signal to a wireless receiver device. The content signal includes at least one of (a) video data in a predetermined video output format and (b) audio data in a predetermined audio output format. The wireless communication device includes controller means for periodically receiving a packet including at least one of the video output format and the audio output format from the wire transmitter device. When at least one of the video output format and the audio output format included in the packet to be processed is different from a corresponding output format included in a packet received prior to the packet to be processed, the controller means generates a first message signal including an output format which is included in the packet to be processed and is different from the corresponding output format included in the packet received prior to the packet to be processed, and wirelessly transmits the first message signal to the wireless receiver device. When the video output format and the audio output format included in the packet to be processed are the same as corresponding output formats included in the packet received prior to the packet to be processed, the controller means prohibits wireless transmission of the first message.

According to the second aspect of the present invention, there is provided a wireless communication device for wirelessly receiving a content signal including at least one of (a) video data in a predetermined video output format and (b) audio data in a predetermined audio output format from a wireless transmitter device, and for outputting the content signal to a wire receiver device via a wire transmission line. The wireless communication device includes controller means for periodically transmitting a packet including at least one of the video output format and the audio output format to the wire receiver device. Upon wirelessly receiving a first message signal including at least one of the video output format and the audio output format, the controller means changes the video output format included in the packet to the video output format included in the first message signal, and changes the audio output format included in the packet to the audio output format included in the first message signal.

In the above-mentioned wireless communication device, upon receiving a second message signal including a CEC (Consumer Electronics Control) message compliant with an HDMI (High-Definition Multimedia Interface) standard from the wire transmission line, the controller means divides the CEC message into a plurality of groups and wirelessly transmits the groups.

In addition, in the above-mentioned wireless communication device, the controller means sets a message length of a first group of the plurality of divided groups to a longest message length.

Further, in the above-mentioned wireless communication device, upon receiving a second message signal including a CEC message compliant with an HDMI standard from the wire transmission line, when a message length of the CEC message is equal to or smaller than 6 octets, the controller means wirelessly transmits the CEC message without dividing the CEC message. When the message length of the CEC message is equal to or larger than 7 octets and equal to or smaller than 11 octets, the controller means divides the CEC message into a group including a first 6 octets part thereof and a group including a remaining part thereof, and wirelessly transmits the groups. When the message length of the CEC message is equal to or larger than 12 octets, the controller means divides the CEC message into a group including a first 6 octets part thereof, a group including a next 5 octets part thereof, and a group including a remaining part thereof, and wirelessly transmits the groups.

Advantageous Effects of Invention

According to the wireless communication device of the first invention, when at least one of the video output format and the audio output format included in the packet to be processed is different from a corresponding output format included in a packet received prior to the packet to be processed, the controller means generates a first message signal including an output format which is included in the packet to be processed and is different from the corresponding output format included in the packet received prior to the packet to be processed, and wirelessly transmits the first message signal to the wireless receiver device. When the video output format and the audio output format included in the packet to be processed are the same as corresponding output formats included in the packet received prior to the packet to be processed, the controller means prohibits wireless transmission of the first message. In addition, according to the wireless communication device of the second invention, upon wirelessly receiving a first message signal including at least one of the video output format and the audio output format, the controller means changes the video output format included in the packet to the video output format included in the first message signal, and changes the audio output format included in the packet to the audio output format included in the first message signal. Therefore, it is possible to wirelessly transmit a content signal more efficiently than the prior art, without consuming a wireless transmission band.

BRIEF DESCRIPTION OF DRAWINGS

FIG. 4 is a sequence diagram showing an example of a message sequence of a device capability exchange process executed by the wireless communication system of FIG. 1.

FIG. 5 is a sequence diagram showing an example of a message sequence executed by the wireless communication system of FIG. 1 for establishment and cancellation of a pass-through connection.

FIG. 6A is an explanatory diagram showing an example of logical addresses and wireless identifiers allocated in the wireless communication system of FIG. 1.

FIG. 6D is a table showing an example of a device information table 14t of FIG. 2.

FIG. 6E is a table showing an example of a device information table 24t of FIG. 3.

Figure 1:
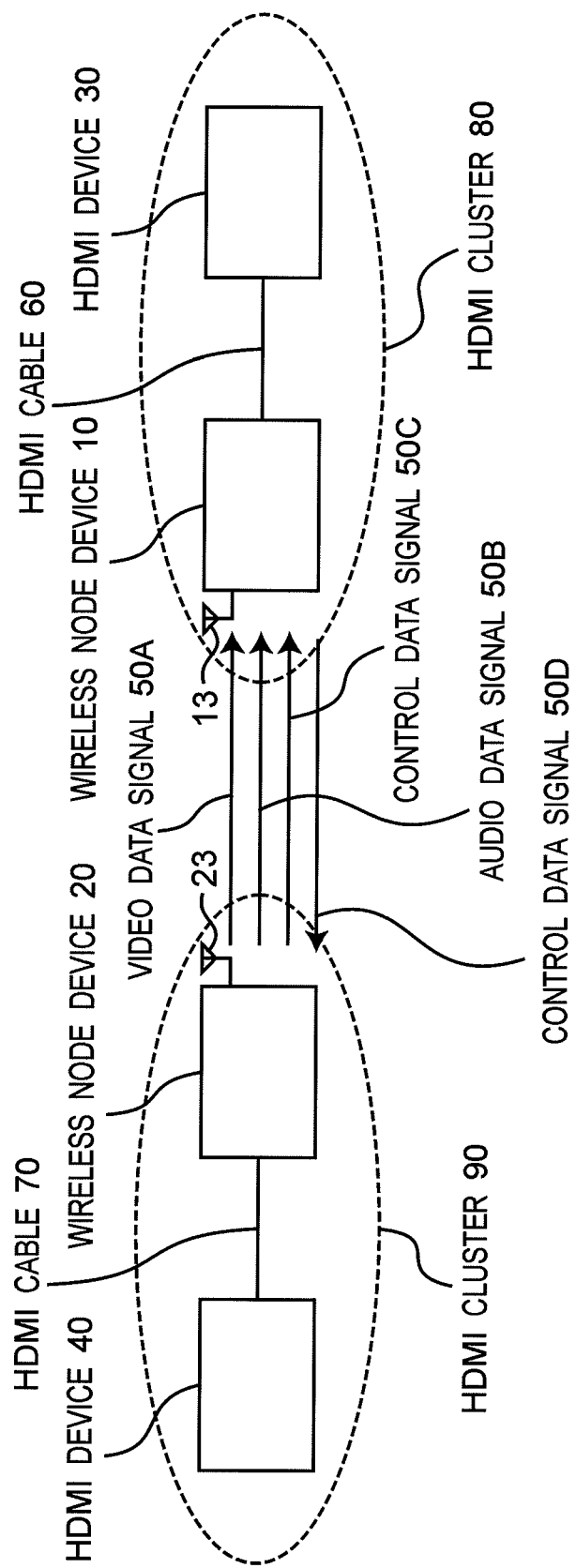
FIG. 1 is a block diagram showing a configuration of a wireless communication system according to an embodiment of the present invention.

REFERENCE SIGNS LIST 10 and 20 . . . wireless node device,
11, 21, 31, and 41 . . . controller,
12 and 22 . . . wireless communication circuit,
13 and 23 . . . antenna,
14 and 24 . . . device information table memory,
14*t* and 24*t* . . . device information table,
15 and 25 . . . connection information memory,
16, 26, 35, and 44 . . . wire communication circuit,
30 and 40 . . . HDMI device,
32 and 43 . . . user input device,
33 . . . audio output device,
34 . . . video output device,
36 and 45 . . . logical address table memory,
36*t* and 46*t* . . . logical address table,
42 . . . audio and visual reproducing device,
50A . . . video data signal,
50B . . . audio data signal,
50C and 50D . . . control data signal,
60 and 70 . . . HDMI cable,
65 . . . device capability request message,
75 . . . device capability response message,
80 and 90 . . . HDMI cluster,
85 . . . pass-through request message,
95 . . . pass-through response message,
100 and 101 . . . CEC notification message,
100-1 to 100-3, and 101-1 to 101-3 . . . CEC notification sub-message,
110 and 111 . . . device information notification message,
120 . . . HPD notification message,
130 . . . EDID request message,
140 . . . EDID response message,
150-1 and 150-2 . . . data island notification message,
160 . . . CEC non-arrival message,
180, 181, 190, and 191 . . . CEC message, and
200-1 to 200-3 and 210-1 to 210-3 . . . data island packet.

BEST MODE FOR CARRYING OUT THE INVENTION

An embodiment of the present invention will be described hereinafter with reference to the drawings. In the embodiment, components similar to each other are denoted by the same reference numerals.

FIG. 1 is a block diagram showing an example of a configuration of a wireless communication system according to the embodiment of the present invention. Referring to FIG. 1, wireless node devices 10 and 20 and HDMI devices 30 and 40 transmit and receive signals compliant with an HDMI standard, respectively. The HDMI device 40 has a wire interface, and outputs video and audio data to the wire interface. In addition, the wireless node device 20 has a wireless interface and a wire interface, receives the video and audio data from the wire interface, and outputs the video and audio data to the wireless interface. Further, the wireless node device 10 has a wireless interface and a wire interface, receives the video and audio data from the wireless interface, and outputs the video and audio data to the wire interface. In addition, the HDMI device 30 has a wire interface, and receives the video and audio data from the wire interface.

The HDMI device 40 and the wireless node device 20 are wirely connected to each other via an HDMI cable 70 of a wire transmission line, and the HDMI device 30 and the wireless node device 10 are wirely connected to each other via an HDMI cable 60 of a wire transmission line. In this case, each of the HDMI cables 60 and 70 is a digital data transmission bus compliant with the HDMI standard, and includes three TMDS (Transition Minimized Differential Signaling) channels, a DDC channel, a CEC (Consumer Electronics Control) bus, and an HPD (Hot Plug Detect) signal line for transmitting an HPD signal. In this case, the HPD signal is defined in the HDMI standard, and is an initialization signal transmitted from a sink device for receiving the video and audio data, to a source device for transmitting the video and audio data in order to initialize the source device. The source device detects that the HPD signal is asserted by detecting that a voltage level of the HPD signal line of the HDMI cable changes from a low level to a high level, and executes a predetermined initialization process such as a logical address allocation process specified in the HDMI. Hereinafter, changing the voltage level of the HPD signal line from the low level to the high level is referred to as "to assert the HDP signal", and changing the voltage level of the HPD signal line from the high level to the low level is referred to as "to de-assert the HDP signal". In addition, the DDC channel is a transmission line used for transmission of DDC data including EDID (Extended Display Identification Data), HDCP (High-Bandwidth Digital Content Protection) authentication process, and regular cipher key exchange between the source device and the sink device. Further, the CEC bus is a transmission line for transmitting a CEC message (to be described below in detail referring to FIG. 22) specified in the HDMI standard between the source device and the sink device.

In addition, the three TMDS channels is a transmission line for transmitting as packets, a TMDS signal which is a content signal including a baseband video signal which includes the video data, a digital audio signal which includes the audio data, a horizontal synchronization signal of the video signal, a vertical synchronization signal of the video signal, and auxiliary data. In this case, data island periods for transmitting the digital audio signal and the auxiliary data as packets are periodically provided in the TMDS signal. In each of the data island periods, a data island packet which includes an AVI (Auxiliary Video Information) InfoFrame packet and Audio InfoFrame packet, where the AVI InfoFrame includes output video format information (referred to as a video output format (specification) hereinafter) on the video data from the source device, and the Audio InfoFrame packet includes output audio format information (referred to as an audio output format (specification) hereinafter) on the audio data from the source device. In this case, the video output format includes a video coding method (for example, RGB, $YC_BC_R$4:4:4 or $YC_BC_R$4:2:2), a resolution, a field frequency, a number of scanning lines and the like. The audio output format includes an audio output sampling frequency and the like.

In addition, the wireless node devices 10 and 20 are wirelessly connected to each other via antennas 13 and 23. The wireless node device 20 generates a video data signal 50A including the video data, an audio data signal 50B including the audio data, and a control data signal 50C based on the TMDS signal, the DDC data and a CEC message 190 received from the HDMI device 40 via the HDMI cable 70, and wirelessly transmits the video data signal 50A, the audio data signal 50B, and the control data signal 50C to the wireless node device 10. Further, the wireless node device 20 executes a predetermined process based on a control data signal 50D from the wireless node device 10. On the other hand, the wireless node device 10 generates the control data signal 50D based on the DDC data and a CEC message 181 received from the HDMI device 30 via the HDMI cable 60, and wirelessly transmits the control data signal 50D to the wireless node device 20. Further, the wireless node device 10 generates the TMDS signal based on the video data signal 50A and the audio data signal 50B from the wireless node device 20, outputs the TMDS signal to the HDMI device 30 via the HDMI cable 60, and executes a predetermined process based on the control data signal 50C. In this case, the control data signal 50C includes a device capability request message 65, a pass-through request message 85, a CEC notification message 100, a device information notification message 110, an EDID request message 120, and a data island notification message 150-1 or a data island notification message 150-2 which is an output format notification packet, all of which will be described below. In addition, the control data signal 50D includes a device capability response message 75, a pass-through response message 95, a CEC notification message 101, a device information notification message 111, an HPD notification message 120, and an EDID response message 140 or a CEC non-arrival message 160, all of which will be described below. In the present specification, a signal including each of the above-described messages will be simply referred to as a "message".

Referring to FIG. 1, an HDMI cluster 80 is a group of devices which includes the wireless node device 10 and the HDMI device 30 wirely connected to each other via the HDMI cable 70. An HDMI cluster 90 is a group of devices which includes the wireless node device 20 and the HDMI device 40 wirely connected to each other via the HDMI cable 60.

In the present embodiment, the wireless node device 10 is a central control device which executes authentication of respective wireless node devices in the wireless network including the wireless node devices 10 and 20 and the other wireless node devices that are not shown, and makes management of entry of each of the wireless node devices to the wireless network and withdrawal of each of the wireless node devices from the wireless network. The wireless node device 10 of the central control device allocates wireless identifiers for identifying the wireless node devices to the wireless node devices in the wireless network, respectively, and generates a device list including the allocated wireless identifiers and information on the wireless node devices. While the central control device is the wireless node device 10 in the present embodiment, the central control device may be the wireless node device 20 or another wireless node device in the wireless network.

In addition, logical addresses for identifying the HDMI devices 30 and 40 are allocated to the HDMI devices 30 and 40, respectively, by the logical address allocation process specified in the HDMI. The wireless node devices 10 and 20 and the HDMI devices 30 and 40 communicate with one another using the wireless identifiers and the logical addresses as will be described below in detail.

Figure 2:
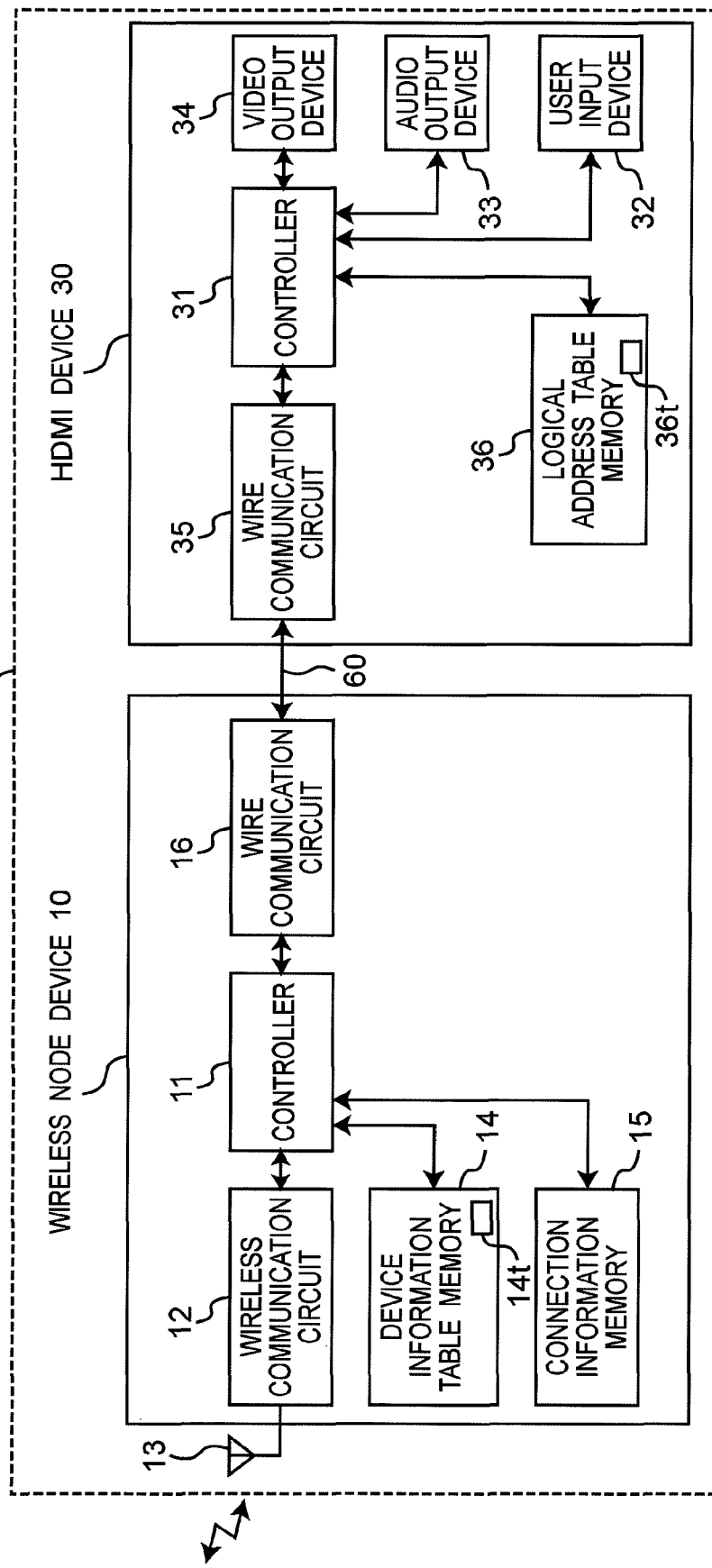
FIG. 2 is a block diagram showing a configuration of an HDMI cluster 80 of FIG. 1.

FIG. 2 is a block diagram showing a configuration of the HDMI cluster 80 of FIG. 1. Referring to FIG. 2, the wireless node device 10 is configured to include a wireless communication circuit 12 connected to the antenna 13, a wire communication circuit 16, a controller 11 controlling operations executed by these components, a device information table memory 14 for storing a device information table 14t to be described below in detail with reference to FIG. 6D, and a connection information memory 15. In this case, the wireless communication circuit 12 operates as the wireless interface, the wire communication circuit 16 is the wire interface for executing processes of transmitting video and audio data signals compliant with the HDMI. The connection information memory 15 stores the wireless identifiers of wireless node devices each establishing connection to the wireless node device 10 in a pass-through mode defined in the HDMI (referred to as an HDMI pass-through mode hereinafter).

In this case, the controller 11 executes the following processes.

(a) A medium access control process of reserving resources of a wireless frequency band or time and transmitting or receiving the video and audio data for a reserved wireless frequency band or time.

(b) A resources management process on the wireless frequency band or time for transmitting the video and audio data.

(c) A port control process including decision, association and the like of ports (namely, a source port of the wireless node device 20 connected to the source device and a destination port of the wireless node device 10 connected to the sink device) used during wireless communication.

(d) A connection management process of setting connection to the other wireless node device.

(e) An application control process including an upper layer process such as a user input process.

In addition, the wireless communication circuit 12 includes a high-rate data transmitting function of wirelessly receiving data at a high transmission rate, and a low-rate data transmitting function of wirelessly transmitting and receiving data at a transmission rate lower than the transmission rate of the high-rate data transmitting function. In this case, the data transmitted by the high-rate data transmitting function includes (a) data, such as uncompressed video data, required to be transmitted at a high rate, (b) and data such as audio data and control commands that can be transmitted at a relatively low transmission rate. The data transmitted by the low-rate data transmitting function include data such as the audio data and the control commands that can be transmitted at a relatively low transmission rate. In the present embodiment, the video data signal 50A and the control data signal 50C are wirelessly received using the high-rate data transmitting function, and the audio data signal 50B and the control data signal 50D are wirelessly transmitted and received using the low-rate data transmitting function.

Further, referring to FIG. 2, the HDMI device 30 wirely connected to the wireless node device 10 via the HDMI cable 60 includes a wire communication circuit 35, a video output device 34 which is a display, an audio output device 33 which is a loudspeaker, a user input device 32, a controller 31 which controls operations executed by these components, and a logical address table memory 36 which stores a logical address table 36t to be described below in detail with reference to FIG. 6B. The user input device 32 includes operation buttons and an instruction signal receiver circuit that are not shown. The user input device 32 receives an instruction signal inputted by a user from the operation buttons or an instruction signal transmitted from a remote controller (not shown) using the instruction signal receiver circuit so as to instruct reproducing, stop or the like of the video and audio data, and transmits the received instruction signal to the controller 31. The video output device 34 and the audio output device 33 output the video data and the audio data wirely transmitted from the wireless node device 10, respectively. The wire connection circuit 35 is configured in a manner similar to that of the wire connection circuit 16 of the wireless node device 10. In the present embodiment, the wireless node device 10 operates as an adapter device for providing a wireless transceiver function with the HDMI device 30.

Figure 3:
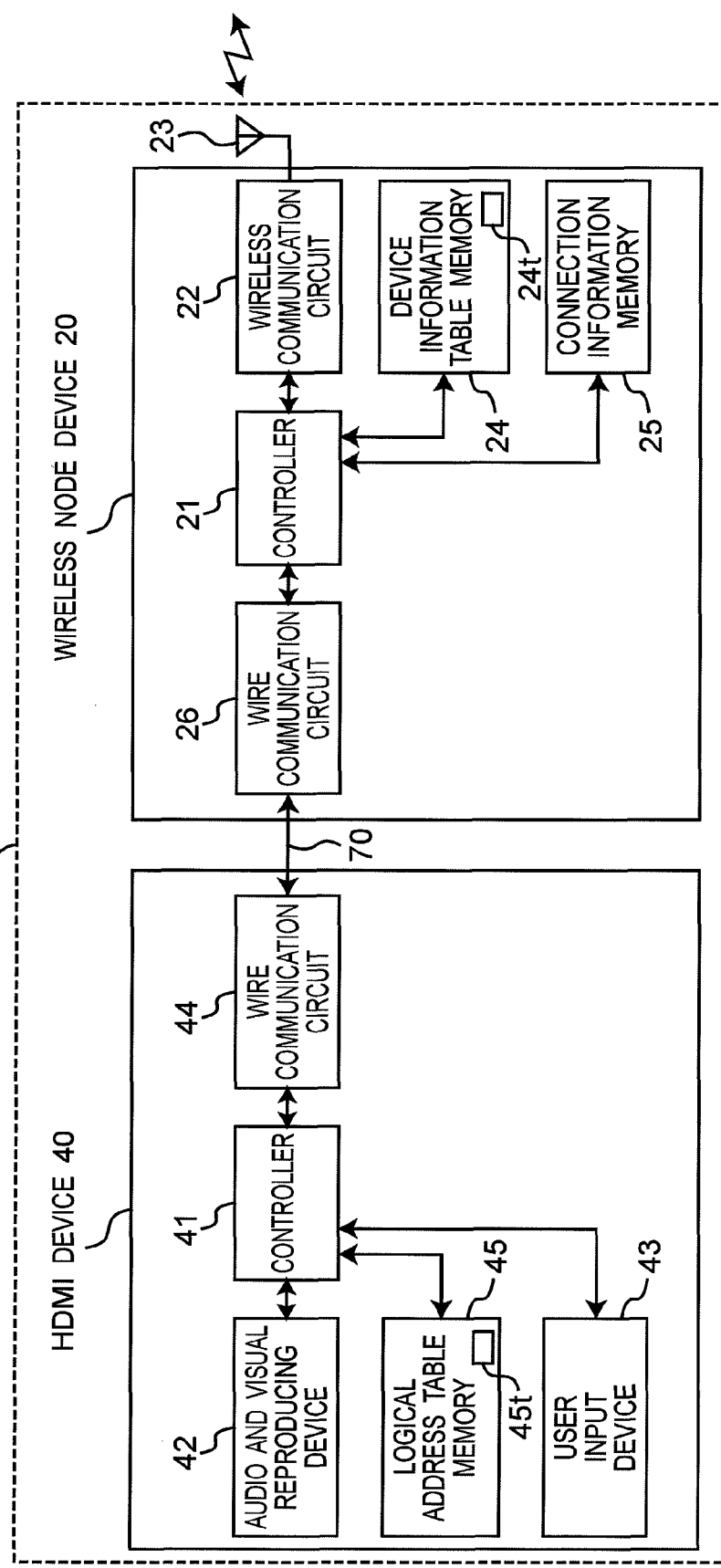
FIG. 3 is a block diagram showing a configuration of an HDMI cluster 90 of FIG. 1.

FIG. 3 is a block diagram showing a configuration of the HDMI cluster 90 of FIG. 1. Referring to FIG. 3, the wireless node device 20 is configured to include a wireless communication circuit 22 connected to the antenna 23, a wire communication circuit 26, a controller 21 controlling operations executed by these components, a device information table memory 24 for storing a device information table 24*t* to be described below in detail with reference to FIG. 6E, and a connection information memory 25. In this case, the wireless communication circuit 22 operates as the wireless interface, the wire communication circuit 26 is the wire interface for executing processes of transmitting video and audio data signals compliant with the HDMI. The connection information memory 25 stores the wireless identifiers of wireless node devices each establishing connection to the wireless node device 20 in the pass-through mode defined in the HDMI.

In this case, the controller 21 executes the following processes.

(a) A medium access control process of reserving resources of a wireless frequency band or time and transmitting or receiving the video and audio data for a reserved wireless frequency band or time.

(b) A resources management process on the wireless frequency band or time for transmitting the video and audio data.

(c) A port control process including decision, association and the like of ports (namely, a source port of the wireless node device 20 connected to the source device and a destination port of the wireless node device 10 connected to the sink device) used during wireless communication.

(d) A connection management process of setting connection to the other wireless node device.

(e) An application control process including an upper layer process such as a user input process.

In addition, the wireless communication circuit 22 includes a high-rate data transmitting function of wirelessly receiving data at a high transmission rate, and a low-rate data transmitting function of wirelessly transmitting and receiving data at a transmission rate lower than the transmission rate of the high-rate data transmitting function. In this case, the data transmitted by the high-rate data transmitting function includes (a) data, such as uncompressed video data, required to be transmitted at a high rate, (b) and data such as audio data and control commands that can be transmitted at a relatively low transmission rate. The data transmitted by the low-rate data transmitting function include data such as the audio data and the control commands that can be transmitted at a relatively low transmission rate. In the present embodiment, the video data signal 50A and the control data signal 50C are wirelessly transmitted using the high-rate data transmitting function, and the audio data signal 50B and the control data signal 50D are wirelessly transmitted and received using the low-rate data transmitting function. In addition, in the present embodiment, the wireless node device 20 operates as an adapter device for providing a wireless transceiver function with the HDMI device 40.

Further, referring to FIG. 3, the HDMI device 40 wirely connected to the wireless node device 20 via the HDMI cable 70 includes a wire communication circuit 44, an audio and visual reproducing device 42 which is a DVD player, a user input device 43 which acquires signals and data inputted by the user, a controller 41 which controls operations executed by these components, and a logical address table memory 45 which stores a logical address table 45*t* to be described below in detail with reference to FIG. 6C. The audio and visual reproducing device 42 acquires the video and audio data by reading out the data from a recording medium such as a DVD. The user input device 43 receives an instruction signal inputted by a user from the operation buttons or an instruction signal transmitted from a remote controller (not shown) using the instruction signal receiver circuit so as to instruct reproducing, stop or the like of the video and audio data, and transmits the received instruction signal to the controller 31. The audio and visual reproducing device 42 may be a set top box (STB) such as a tuner for acquiring the video and audio data by processing a broadcasting signal broadcast from a remote transmitter station.

It should be noted that the controllers 11, 21, 31 and 41 controls the operations of the wireless node devices 10 and 20 and the HDMI devices 30 and 40, respectively, however, the descriptions of the controllers 11, 21, 31 and 41 will be omitted herein.

Next, a device capability exchange process executed by the wireless communication system of FIG. 1 will be described. FIG. 4 is a sequence diagram showing an example of a message sequence of the device capability exchange process executed by the wireless communication system of FIG. 1. The wireless node device 20 executes a predetermined authentication process with the wireless node device 10 of the central control device, and thereafter, acquires the device list from the wireless node device 10, where the device list includes the information on and identifiers of the respective wireless node devices in the wireless network of FIG. 1. In the present embodiment, the acquired device list includes the wireless identifier of the wireless node device 10. The wireless node device 20 wirelessly transmits the device capability request message 65 including information indicating a capability of the wireless node device 20 to all of the wireless node devices (including the wireless node device 10) in the acquired device list. Upon receiving the device capability request message 65, the wireless node device 10 stores information included in the device capability request message 65 in the device information table memory 14, and wirelessly transmits the device capability response message 75 including information indicating a capability of the wireless node device 10 to the wireless node device 20 which is a source of the device capability request message 65. Upon receiving the device capability response message 75, the wireless node device 20 stores the information included in the device capability response message 75 in the device information table memory 24. In this case, each of the device capability request message 65 and the device capability response message 75 includes device type information, video and audio type information, wireless type information, the other flags and the like on the wireless node device which is the source of the message. The device type information indicates type of the wireless node device selected from among a television broadcasting receiver, a DVD recorder, an AV amplifier, a set top box or the like. The video and audio type information indicates whether or not video and audio data can be inputted and outputted to and from the wireless node device. The wireless type information indicates whether the wireless node device can transmit and receive data at a high rate and a low rate. The other flags include a PT (Pass-Through) bit indicating whether or not the wireless node device supports the HDMI pass-through mode.

Next, establishment and cancellation of connection in the HDMI pass-through mode (referred to as pass-through connection hereinafter) will be described. FIG. 5 is a sequence diagram showing an example of a message sequence executed by the wireless communication system of FIG. 1 for the establishment and cancellation of the pass-through connection.

After the device capability exchange process of FIG. 4 is executed, the wireless node device 20 recognizes whether or not the wireless node device 10 supports the HDMI pass-through mode based on PT bit data of the respective wireless node devices stored in the device information table memory 24. When the wireless node device 10 of the other party for the communication supports the HDMI pass-through mode (when the PT bit of the wireless node device 10 is set to data indicating that the wireless node device 10 supports the HDMI pass-through mode), the wireless node device 20 wirelessly transmits the pass-through request message 85 for requesting establishment of the pass-through connection to the wireless node device 10. In this case, a bit indicating establishment of the pass-through connection is set in the pass-through request message 85. In response to this, when the wireless node device 10 accepts the request of establishment of the pass-through connection, the wireless node device 10 sets data indicating "success" in a result code field included in the pass-through response message 95, wirelessly transmits the pass-through response message 95 to the wireless node device 20, and adds the wireless identifier of the wireless node device 20 to the connection information memory 15. In addition, when the wireless node device 10 does not accept the request of establishment of the pass-through connection, the wireless node device 10 sets data indicating "failure" in the result code field included in the pass-through response message 95, and wirelessly transmits the pass-through response message 95 to the wireless node device 20. In response to the pass-through response message 95 including the result code field indicating "success", the wireless node device 20 adds the wireless identifier of the wireless node device 10 to the connection information memory 25.

In addition, when the wireless node device 20 requests the other wireless node device 10 to cancel the pass-through connection, the wireless node device 20 transmits the pass-through request message 85 for requesting cancellation of the pass-through connection to the wireless node device 10. In this case, a bit indicating cancellation of the pass-through connection is set in the pass-through request message 85. In response to this, when the wireless node device 10 accepts the request of cancellation of the pass-through connection, the wireless node device 10 sets data indicating "success" in the result code field included in the pass-through response message 95, wirelessly transmits the pass-through response message 95 to the wireless node device 20, and deletes the wireless identifier of the wireless node device 20 from the connection information memory 15. When the wireless node device 10 does not accept the request of cancellation of the pass-through connection, the wireless node device 10 sets data indicating "failure" in the result code field included in the pass-through response message 95, and wirelessly transmits the pass-through response message 95 to the wireless node device 20. In response to the pass-through response message 95 including the result code field indicating "success", the wireless node device 20 deletes the wireless identifier of the wireless node device 10 from the connection information memory 25.

It is to be noted that the pass-through connection is canceled when one wireless node device withdraws from the wireless network. The withdrawal of the wireless node device from the wireless network is detected based on information indicating the withdrawal of the wireless node device included in a beacon signal wirelessly transmitted from the central control device. Alternatively, each of the wireless node devices may confirm whether or not the wireless node device to which the pass-through connection is established is connected to the wireless network by periodically transmitting a predetermined message to the wireless node device of the other party for the communication.

Figure 6B:
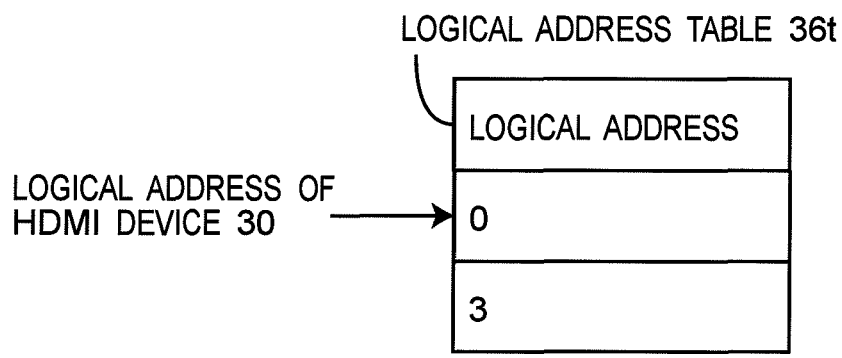
FIG. 6B is a table showing an example of a logical address table 36t of FIG. 2.
Figure 6C:
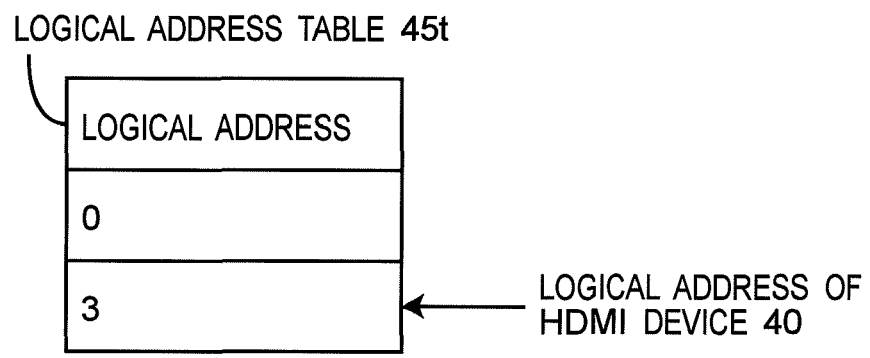
FIG. 6C is a table showing an example of a logical address table 45t of FIG. 3.

FIG. 6A is an explanatory diagram showing an example of the logical addresses and the wireless identifiers allocated in the wireless communication system of FIG. 1. In addition, FIG. 6B is a table showing an example of the logical address table 36t of FIG. 2, and FIG. 6C is a table showing an example of the logical address table 45t of FIG. 3. Further, FIG. 6D is a table showing an example of the device information table 14t of FIG. 2, and FIG. 6E is a table showing an example of the device information table 24t of FIG. 3.

As shown in FIG. 6A, in the present embodiment, logical addresses 3 and 0 are allocated to the HDMI devices 30 and 40, respectively, and wireless identifiers 2 and 1 are allocated to the wireless node devices 10 and 20, respectively. In this case, as shown in FIGS. 6B and 6C, each of the logical address tables 36t and 45t stores the logical addresses of the HDMI devices 30 and 40 in the wireless communication system of FIG. 1. In addition, as shown in FIG. 6D, the device information table 14t stores the wireless identifiers of the respective wireless node devices 10 and 20 in the wireless communication system of FIG. 1, the logical addresses of the HDMI devices 30 and 40 wirely connected to the wireless node devices 10 and 20, respectively, and wire connection flags (Wired flags) indicating whether or not the HDMI devices 30 and 40 are included in the HDMI cluster 80, respectively, so that the wireless identifiers, the logical addresses and the wire connection flags correspond to one another. Further, as shown in FIG. 6E, the device information table 24t stores the wireless identifiers of the respective wireless node devices 10 and 20 in the wireless communication system of FIG. 1, the logical addresses of the HDMI devices 30 and 40 wirely connected to the wireless node devices 10 and 20, respectively, and wire connection flags indicating whether or not the HDMI devices 30 and 40 are included in the HDMI cluster 90, respectively, so that the wireless identifiers, the logical addresses and the wire connection flags correspond to one another. It is to be noted that the wire connection flags is set to 1 when a HDMI cluster in which the HDMI device is included is the same as a HDMI cluster in which the wireless node device is included, and the wire connection flags is set to 0 when the HDMI cluster in which the HDMI device is included is not the same as the HDMI cluster in which the wireless node device is included.

Next, there will be described a method of transmitting and receiving CEC messages between the HDMI devices 30 and 40 in the wireless communication system of FIG. 1.

Figure 22:
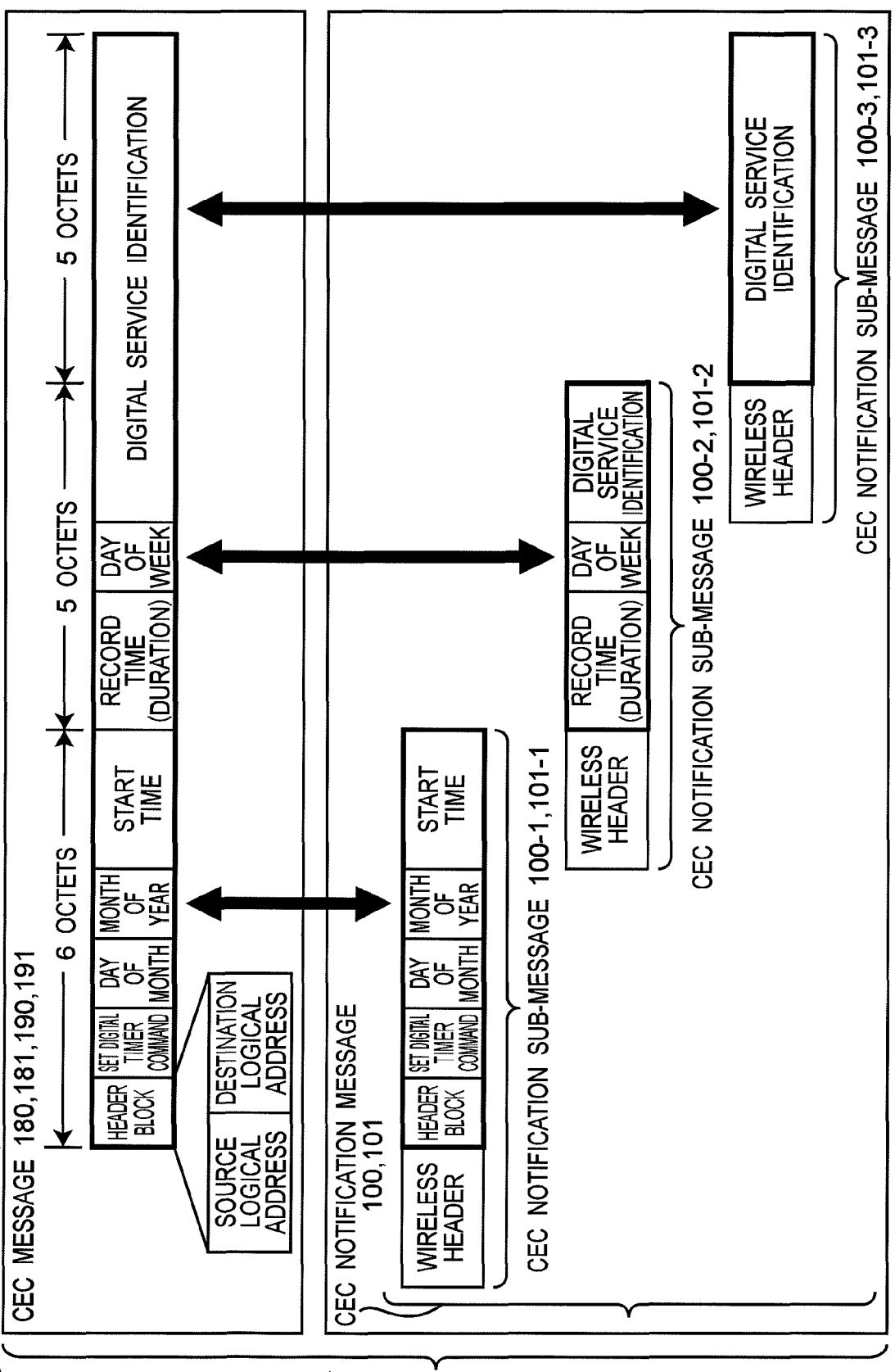
FIG. 22 is an explanatory diagram showing an example of a format of each of CEC messages 180, 181, 190 and 191 transmitted or received in the wireless communication system of FIG. 1, and an example of a format of each of the CEC notification messages 100 and 101 wirelessly transmitted or received in the wireless communication system of FIG. 1.

FIG. 22 shows an example of a format of each of the CEC messages 180, 181, 190 and 191 transmitted and received in the wireless communication system of FIG. 1. Each of the CEC message 190 transmitted from the HDMI device 40 to the wireless node device 20, the CEC message 191 transmitted from the wireless node device 20 to the HDMI device 40, the CEC message 180 transmitted from the wireless node device 10 to the HDMI device 30, and the CEC message 181 transmitted from the HDMI device 30 to the wireless node device 10 has the format of FIG. 22. In the present specification, when the CEC messages 180, 181, 190 and 191 are not distinguished from one another, each of the CEC messages 180, 181, 190 and 191 is simply described as "a CEC message". In the example of FIG. 22, the CEC message has a message length of 16 octets, and includes a header block which includes a source logical address of 4 bits and a destination logical address of 4 bits, a set digital timer command specified in the HDMI, a day of month, a month of year, start time, record time (duration), a day of week (recording sequence), and a digital service identification. In the format of the CEC message of FIG. 22, parts other than the header block have various fauns specified in the HDMI, and the message length of the CEC message has an arbitrary value equal to or larger than 8 bits.

Each of the HDMI devices 30 and 40 and the wireless node devices 10 and 20 generates the CEC message, divides the generated CEC message into at least one data block having a message length of 1 octet, adds an EOM (End Of Message) bit of 1 bit and an ACK (Acknowledge) bit of 1 bit to each data block, and outputs the resultant at least one data block to the CEC bus. The EOM bit indicates whether or not the data block, to which the EOM bit is added, is the last data block of the CEC message. In this case, the EOM bit is set to 1 when the data block, to which the EOM bit is added, is the last data block of the CEC message. In addition, the ACK bit is set to 0 when a receiver side received the data block normally. On the other hand, each of the HDMI devices 30 and 40 and the wireless node device 10 and 20 transmits back an ACK signal via the CEC bus each time when the data block of the CEC message is received normally.

In addition, a message including only the header block is referred to as a polling message among the CEC messages. A value of the EOM bit added to the polling message is 1. Each of the HDMI devices 30 and 40 and the wireless node device 10 and 20 determines that the received data block is the polling message when the received data block includes the header block and the value of the added EOM bit is 1.

Figure 7:
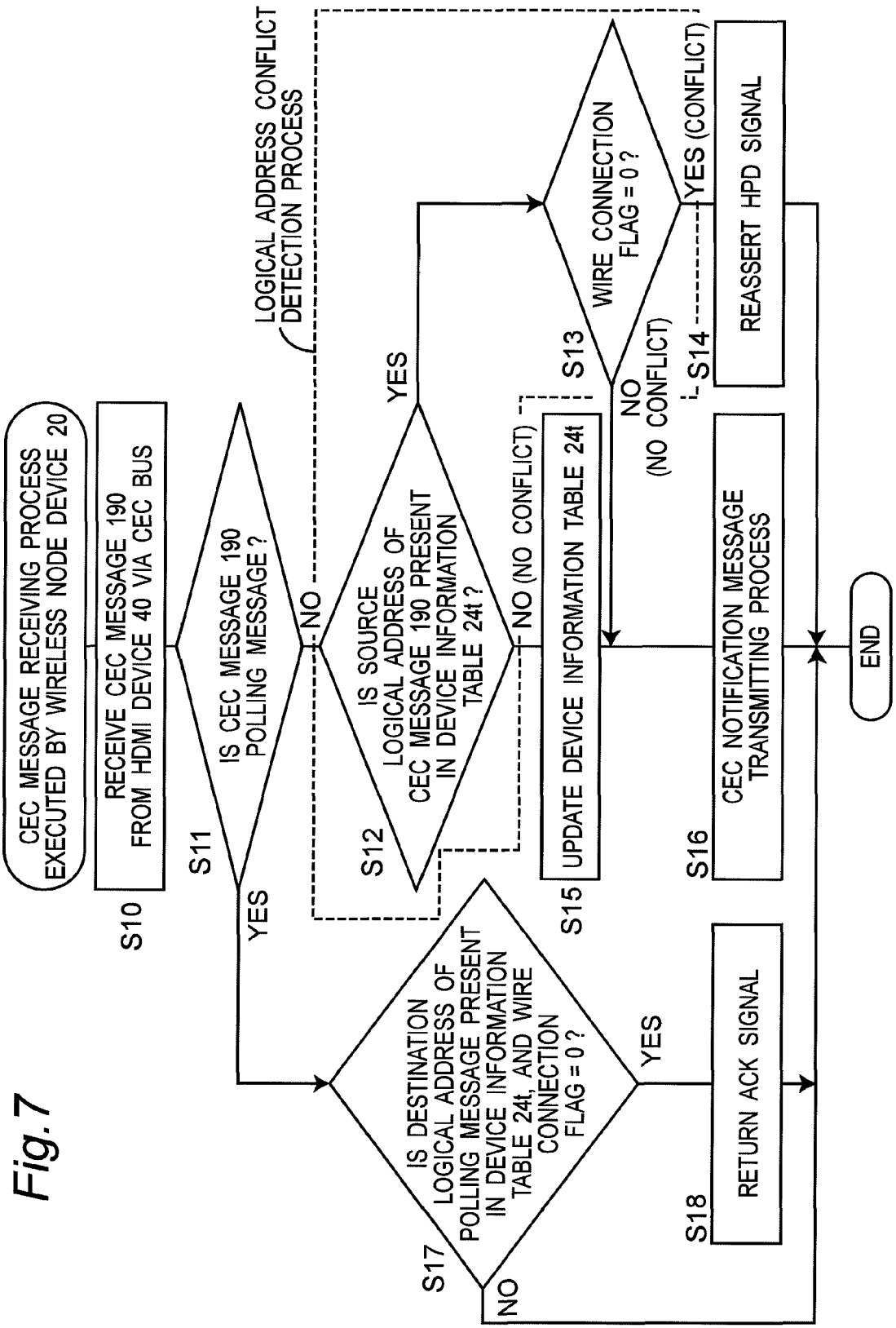
FIG. 7 is a flowchart showing a CEC message receiving process executed by a wireless node device 20 of FIG. 1.

FIG. 7 is a flowchart showing a CEC message receiving process executed by the wireless node device 20 of FIG. 1. At step S10, the wireless node device 20 receives the CEC message 190 from the HDMI device 40 via the CEC bus of the HDMI cable 70, and at step S11, the wireless node device 20 determines whether or not the received CEC message 190 is the polling message. If YES at step S11, the control flow goes to step S17. On the other hand, if NO at step S11, the control flow goes to step S12. Next, at step S12, the wireless node device 20 determines whether or not a source logical address of the received CEC message 190 is present in the device information table 24t. If YES at step S12, the control flow goes to step S13. On the other hand, if NO at step S12, the control flow goes to step S15. At step S12, (a) when a destination logical address is a broadcast address (a value of which is 15) or (b) when the destination logical address is included in the device information table 24t and the wire connection flag corresponding to the destination logical address is 0, the an ACK signal is transmitted back. Then, at step S13, the wireless node device 20 determines whether or not the wire connection flag corresponding to the source logical address is 0 with referring to the device information table 24t. If YES at step S13, the control flow goes to step S14. On the other hand, if NO at step S13, the control flow goes to step S16.

In this case, steps S12 and S13 constitute a logical address conflict detection process. In the logical address conflict detection process, it is detected that whether or not the source logical address of the CEC message 190 generated in the HDMI cluster 90 is also used in the HDMI cluster 80 in conflict. If NO at step S12 or S13, it is determined that there is no logical address conflict. On the other hand, YES at step S13, it is determined that there is the logical address conflict. When there is the logical address conflict, the wireless node device 20 reasserts the HPD signal on the HPD signal line of the HDMI cable 70 without transmitting the ACK signal in response to the received CEC message at step S14, and terminates the CEC message receiving process. When the HPD signal is reasserted, the HDMI device 40 determines that the HDMI device 40 is connected again to the wireless node device 20, and executes the logical address allocation process defined in the HDMI. In the logical address allocation process, the HDMI device 40 transmits polling messages to all of logical address candidates including the conflicting logical address. In response to this, the wireless node device 20 transmits back an ACK signal at step S18. The HDMI device 40 selects a logical address to which the ACK signal is not transmitted back. Therefore, the logical address of the HDMI device 40 is changed, and the logical address conflict is resolved.

On the other hand, at step S15, the wireless node device 20 adds the source logical address of the CEC message 190, the wireless identifier of the wireless node device 20 itself, and the wire connection flag having a value 1 to the device information table 24t. Then, the control flow goes to step S16. When there is no logical address conflict, at step S16, the wireless node device 20 generates the CEC notification message 100 based on the CEC message 190 by executing a CEC notification message transmitting process, to be described below with reference to FIGS. 20 and 23, and wirelessly transmits the CEC notification message 100 to the wireless node device 10 at step S16. Then the CEC message receiving process is terminated.

On the other hand, when the polling message is received, it is determined whether or not a destination logical address of the polling message is present in the device information table 24t, and whether or not the wire connection flag corresponding to the destination logical address is 0, at step S17. If YES at step S17, the wireless node device 20 transmits back an ACK signal by proxy for a device having the destination logical address of the polling message at step S18. On the other hand, if NO at step S17, the wireless node device 20 terminates the CEC message receiving process.

Figure 8:
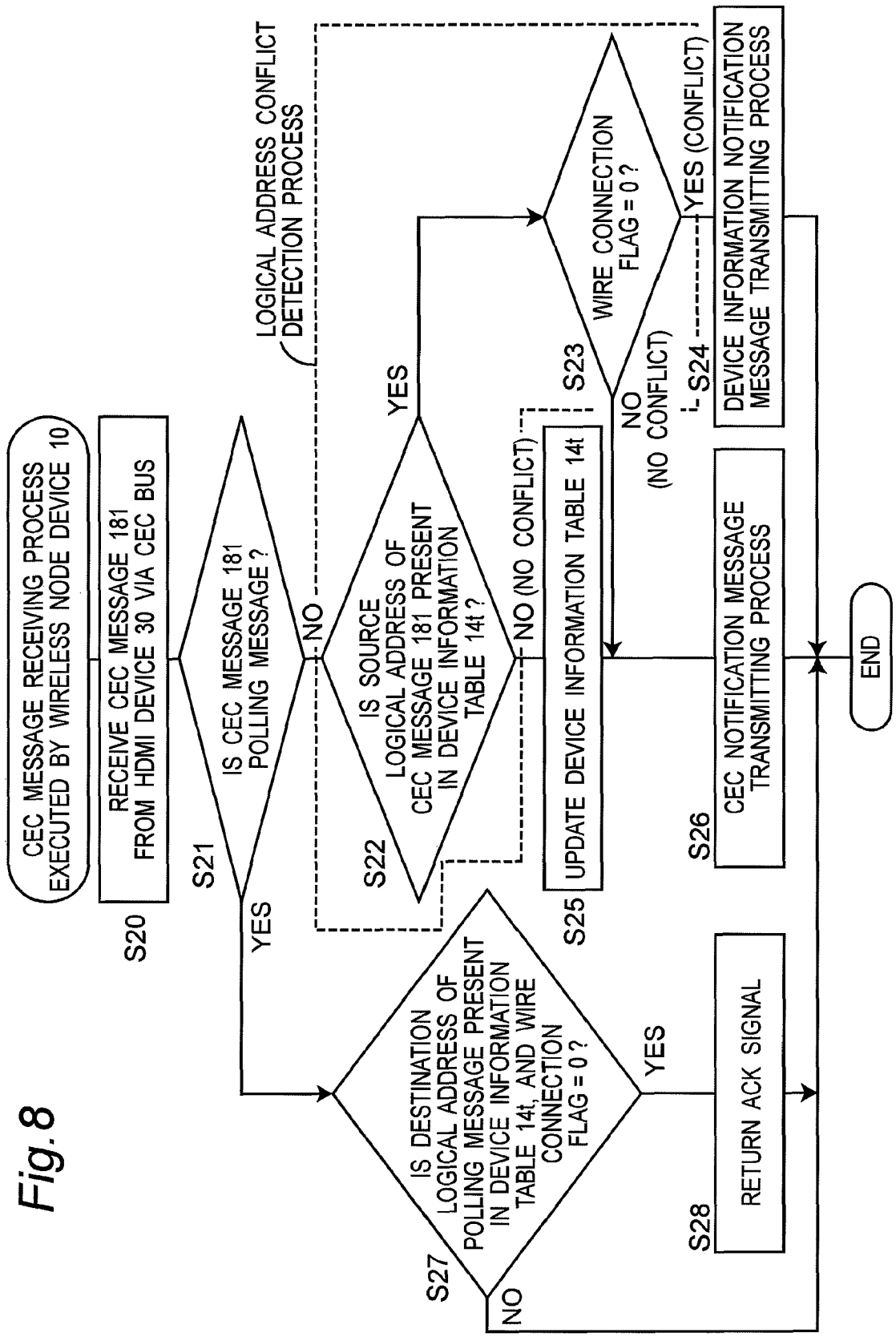
FIG. 8 is a flowchart showing a CEC message receiving process executed by a wireless node device 10 of FIG. 1.

FIG. 8 is a flowchart showing a CEC message receiving process executed by the wireless node device 10 of FIG. 1. At step S20, the wireless node device 10 receives the CEC message 181 from the HDMI device 30 via the CEC bus of the HDMI cable 60. At step S21, the wireless node device 10 determines whether or not the received CEC message 181 is a polling message. If YES at step S21, the control flow goes to step S27. On the other hand, if NO at step S21, the control flow goes to step S22. Next, at step S22, it is determined whether or not a source logical address of the received CEC message 181 is present in the device information table 14t. If YES at step S22, the control flow goes to step S23. On the other hand, if NO at step S22, the control flow goes to step S25. At step S22, (a) when a destination logical address is the broadcast address (a value of which is 15) or (b) when the destination logical address is included in the device information table 14t and the wire connection flag corresponding to the destination logical address is 0, the ACK signal is transmitted back. Then, at step S23, the wireless node device 10 determines whether or not the wire connection flag corresponding to the source logical address is 0 with referring to the device information table 14t. If YES at step S23, the control flow goes to step S24. On the other hand, if NO at step S23, the control flow goes to step S26.

In this case, steps S22 and S23 constitute a logical address conflict detection process. In the logical address conflict detection process, it is detected whether or not the source logical address of the CEC message 181 generated in the HDMI cluster 80 is also used in the HDMI cluster 90 in conflict. If NO at step S22 or S23, it is determined that there is no logical address conflict. On the other hand, if YES at step S23, it is determined that there is the logical address conflict. When there is the logical address conflict, the wireless node device 10 executes a device information notification message transmitting process without transmitting the ACK signal in response to the received CEC message at step S24, and terminates the CEC message receiving process. In the device information notification message transmitting process, the wireless node device 10 generates the device information notification message 111 including data in the device information table 14t, and wirelessly transmits the device information notification message 111 to the wireless node device 20. In response to this, the wireless node device 20 executes a device information notification message receiving process, to be described below in detail with reference to FIG. 11.

On the other hand, at step S25, the wireless node device 10 adds the source logical address of the CEC message 181, the wireless identifier of the wireless node device 10 itself, and the wire connection flag having a value 1 to the device information table 14t. Then, the process then goes to step S26. When there is no logical address conflict, the wireless node device 10 generates the CEC notification message 101 based on the CEC message 181 by executing the CEC notification message transmitting process, to be described below with reference to FIGS. 20 and 23, and wirelessly transmits the CEC notification message 101 to the wireless node device 10 at step S26. Then the CEC message receiving process is terminated.

On the other hand, at step S27, it is determined whether or not a destination logical address of the polling message is present in the device information table 14t and whether or not the wire connection flag corresponding to the destination logical address is 0. If YES at step S27, the wireless node device 10 transmits back an ACK signal by proxy for a device having the destination logical address of the polling message at step S28. On the other hand, if NO at step S27, the wireless node device 10 terminates the CEC message receiving process.

Figure 9:
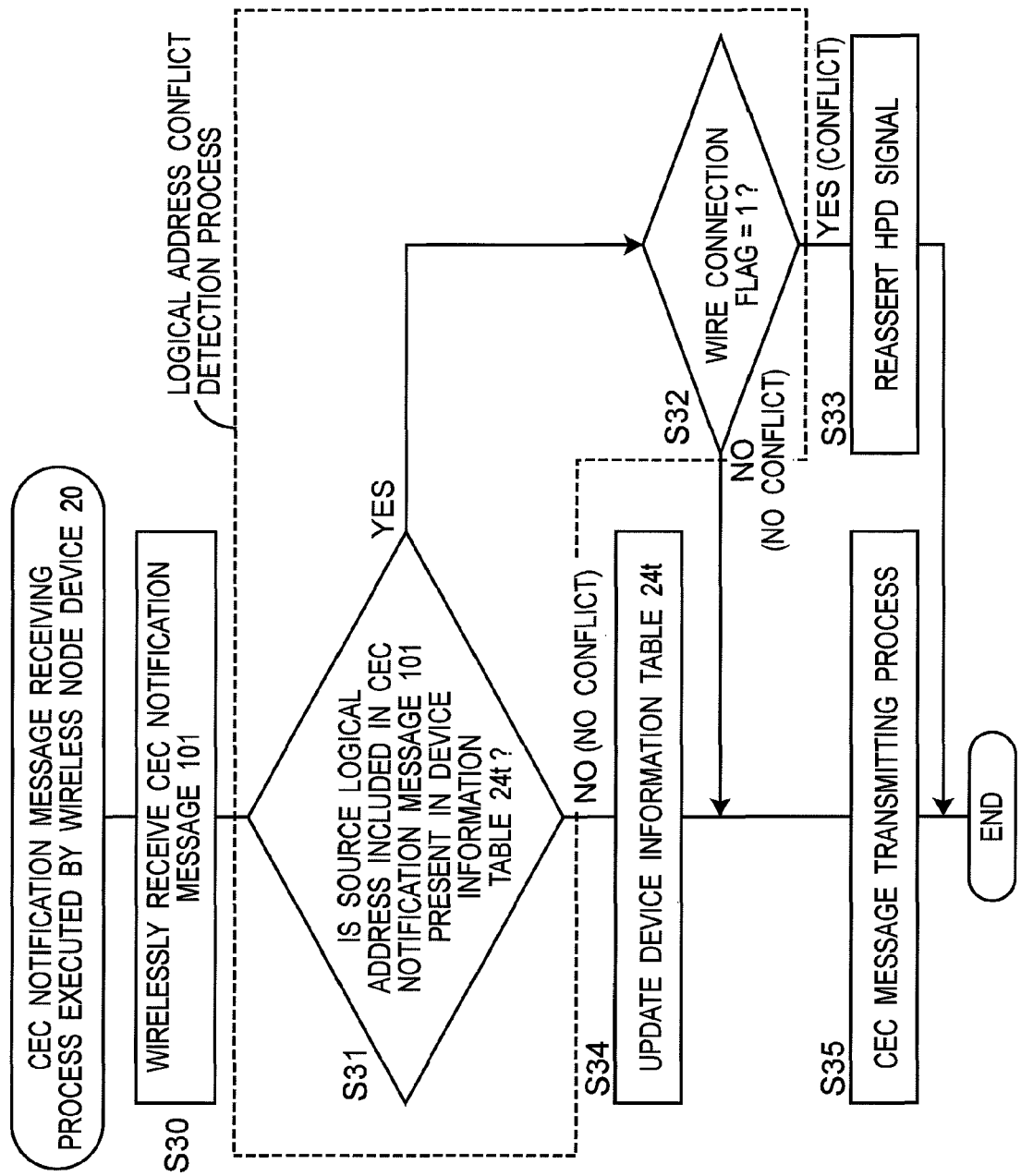
FIG. 9 is a flowchart showing a CEC notification message receiving process executed by the wireless node device 20 of FIG. 1.

FIG. 9 is a flowchart showing a CEC notification message receiving process executed by the wireless node device 20 of FIG. 1. At step S30, the wireless node device 20 wirelessly receives the CEC notification message 101 from the wireless node device 10. In this case, as described below in detail with reference to FIGS. 20, 22 and 23, the CEC notification message 101 is generated by the wireless node device 10 based on the CEC message 181 from the HDMI device 30, and includes CEC notification sub-messages 101-1, 101-3 and 101-3. A wireless header (See FIG. 22) of each of the CEC notification sub-messages 101-1, 101-2 and 101-3 includes the logical address of the HDMI device 30 that is the source of the CEC message 181, and the wireless identifier of the wireless node device 10 that is the source of the CEC notification message 101. At step S31, the wireless node device 10 determines whether or not the source logical address of the CEC message 181 included in the received CEC notification message 101 is included in the device information table 24t. If YES at step S31, the control flow goes to step S32. On the other hand, if NO at step S31, the control flow goes to step S34. Then, at step S32, it is determined whether or not the wire connection flag corresponding to the source logical address of the CEC message 181 is 1 with referring to the device information table 24t. If YES at step S32, the control flow goes to step S33. On the other hand, if NO at step S32, the control flow goes to step S35. At step S34, the wireless node device 20 adds the source logical address of the CEC message 181, the wireless identifier of the wireless node device 10 that is the source of the CEC notification message 101, and the wire connection flag having a value of zero to the device information table 24t. Then, the control flow goes to step S35.

In this case, steps S31 and S32 constitute a logical address conflict detection process. In the logical address conflict process, it is detected whether or not the source logical address of the CEC message 181 generated in the HDMI cluster 80 is also used in the HDMI cluster 90 in conflict. If NO at step S31 or S32, it is determined that there is no logical address conflict. On the other hand, if YES at step S32, it is determined that there is the logical address conflict. When there is the logical address conflict, the wireless node device 20 reasserts the HPD signal on the HPD signal line of the HDMI cable 70 at step S33, and terminates the CEC notification message receiving process. Therefore, the logical address conflict is resolved in a manner similar to that of the process at step S14 of FIG. 7.

When there is no logical address conflict, the HDMI device 20 converts the CEC notification message 101 into the CEC message 191 which is the same as the CEC message 181 outputted by the HDMI device 30, and transmits the CEC message 191 to the HDMI device 40 via the CEC bus of the HDMI cable 70. The wireless node device 20 then terminates the CEC notification message receiving process.

Figure 10:
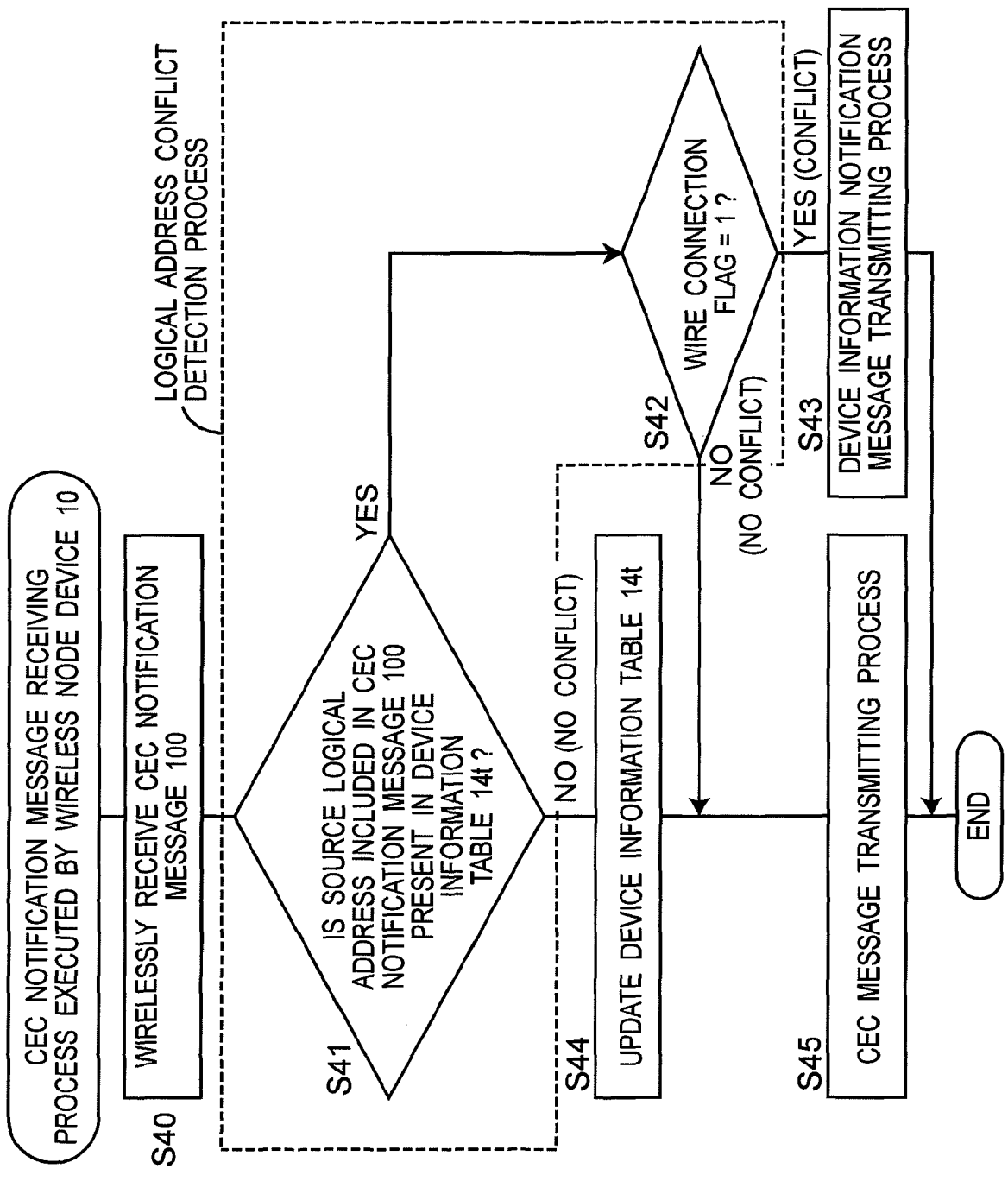
FIG. 10 is a flowchart showing a CEC notification message receiving process executed by the wireless node device 10 of FIG. 1.

FIG. 10 is a flowchart showing a CEC notification message receiving process executed by the wireless node device 10 of FIG. 1. At step S40, the wireless node device 10 wirelessly receives the CEC notification message 100 from the wireless node device 20. In this case, as described below in detail with reference to FIGS. 20, 22 and 23, the CEC notification message 100 is generated by the wireless node device 20 based on the CEC message 190 from the HDMI device 40, and includes CEC notification sub-messages 100-1, 100-2 and 100-3. A wireless header (See FIG. 22) of each of the CEC notification sub-messages 100-1, 100-2 and 100-3 includes the logical address of the HDMI device 40 that is the source of the CEC message 190, and the wireless identifier of the wireless node device 20 that is the source of the CEC notification message 100. At step S41, the wireless node device 10 determines whether or not the source logical address of the CEC message 190 included in the received CEC notification message 100 is included in the device information table 14t. If YES at step S41, the control flow goes to step S42. On the other hand, if NO at step S41, the control flow goes to step S44. Then, at step S42, it is determined whether or not the wire connection flag corresponding to the source logical address of the CEC message 90 is 1 with referring to the device information table 14t. If YES at step S42, the control flow goes to step S43. On the other hand, if NO at step S42, the control flow goes to step S45. At step S44, the wireless node device 10 adds the source logical address of the CEC message 190, the wireless identifier of the wireless node device 20 that is the source of the CEC notification message 100, and the wire connection flag having a value of zero to the device information table 14t. Then, the process then goes to step S45.

In this case, steps S41 and S42 constitute a logical address conflict detection process. In the logical address conflict detection process, the wireless node device 10 detects whether or not the source logical address of the CEC message 190 generated in the HDMI cluster 90 is also used in the HDMI cluster 80 in conflict. If NO at step S41 or S42, it is determined that there is no logical address conflict. On the other hand, if YES at step S42, it is determined that there is the logical address conflict. When there is the logical address conflict, at step S43, the wireless node device 10 executes the device information notification message transmitting process at step S43 so as to generate the device information notification message 111 including the data in the device information table 14t, and wirelessly transmits the device information notification message 111 to the wireless node device 20. In response to this, the wireless node device 20 executes the device information notification message receiving process, to be described below in detail with reference to FIG. 11.

When there is no logical address conflict, at step S45, the wireless node device 10 converts the CEC notification message 100 into the CEC message 180 which is the same as the CEC message 190 outputted by the HDMI device 40, and transmits the CEC message 180 to the HDMI device 30 via the CEC bus of the HDMI cable 60. Then, the wireless node device 10 then terminates the CEC notification message receiving process.

Figure 11:
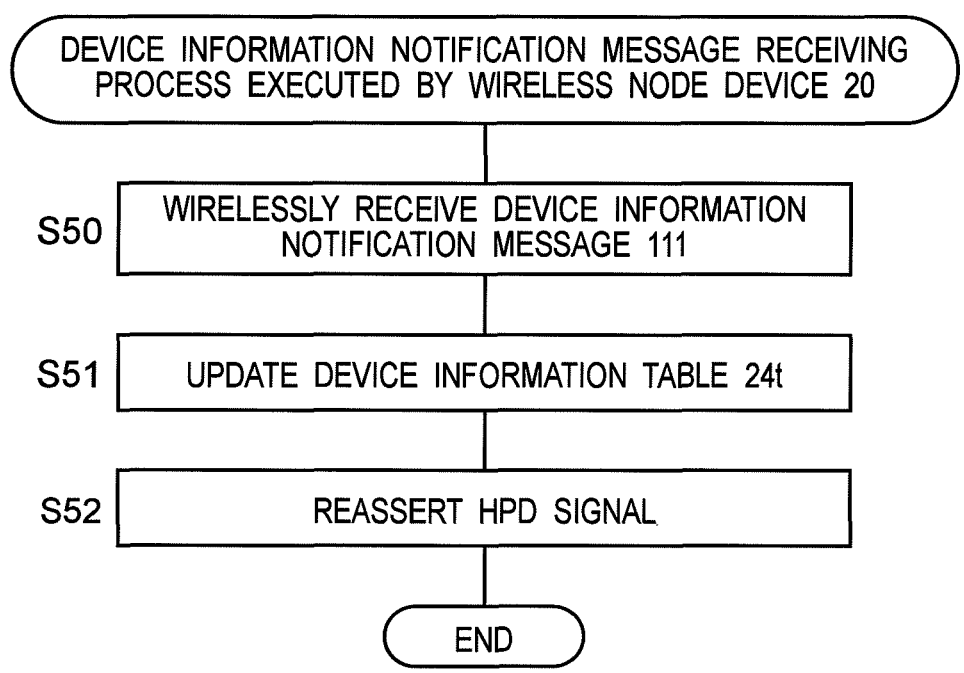
FIG. 11 is a flowchart showing a device information notification message receiving process executed by the wireless node device 20 of FIG. 1.

FIG. 11 is a flowchart showing the device information notification message receiving process executed by the wireless node device 20 of FIG. 1. At step S50, the wireless node device 20 wirelessly receives the device information notification message 111 from the wireless node device 10. Then, at step 51, the wireless node device 20 updates the data in the device information table 24t to the data in the device information table 14t included in the device information notification message 111. Further, at step S52, the wireless node device 20 reasserts the HPD signal on the HDP signal line of the HDMI cable 70. Therefore, the logical address conflict is resolved in a manner similar to that of the process at step S14 of FIG. 7.

Figure 12:
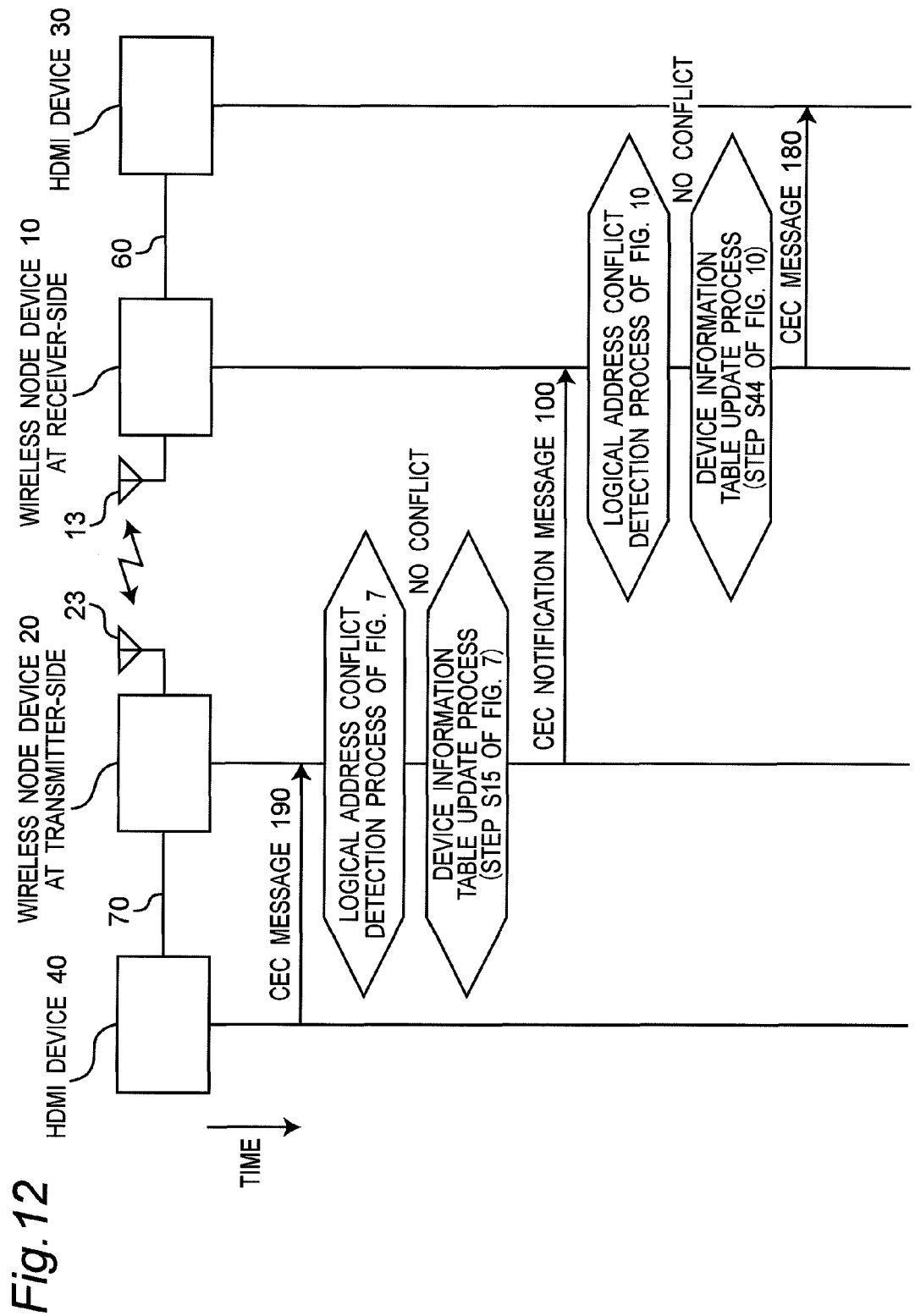
FIG. 12 is a sequence diagram showing an example of a message sequence in such a case where a logical address conflict is not detected by each of the wireless node devices 10 and 20 of FIG. 1.

FIG. 12 is a sequence diagram showing an example of a message sequence in such a case where the logical address conflict is not detected by each of the wireless node devices 10 and 20 of FIG. 1. Referring to FIG. 12, in the CEC message receiving process of FIG. 7, the wireless node device 20 receives the CEC message 190 from the HDMI device 40 and executes the logical address conflict detection process. When the logical address conflict is not detected in the logical address conflict detection process, the device information table 24t is updated at step S15. Further, at step S16, the CEC notification message 100 is generated, and wirelessly transmitted to the wireless node device 10.

In the CEC notification message receiving process of FIG. 10, the wireless node device 10 wirelessly receives the CEC notification message 100, and executes the logical address conflict detection process. Then, when the logical address conflict is not detected in the logical address conflict detection process, the device information table 14t is updated at step S44. Further, at step S45, the CEC notification message 100 is converted into the CEC message 180, and outputted to the HDMI device 30. As shown in FIG. 12, the logical address conflict is not detected in both of the wireless node devices 10 and 20, the CEC message 190 generated by the HDMI device 40 is transmitted to the HDMI device 30 via the wireless node devices 20 and 10.

Figure 13:
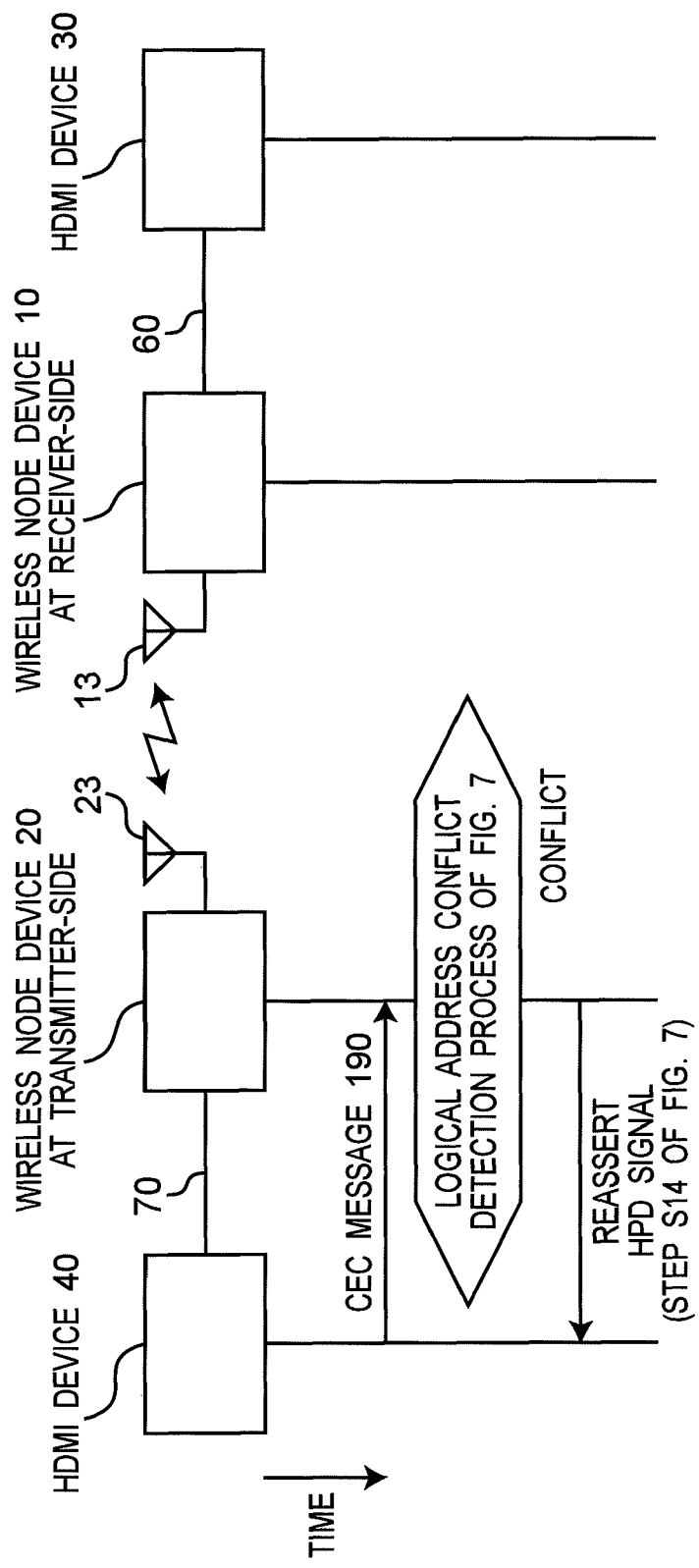
FIG. 13 is a sequence diagram showing an example of a message sequence in such a case where a logical address conflict is detected when the wireless node device 20 of FIG. 1 receives a CEC message 190 from an HDMI device 40.

FIG. 13 is a sequence diagram showing an example of a message sequence in such a case where the logical address conflict is detected when the wireless node device 20 of FIG. 1 receives the CEC message 190 from the HDMI device 40. FIG. 13 is different from FIG. 12 only in that the wireless node device 20 detects the logical address conflict. Referring to FIG. 13, when the wireless node device 20 detects the logical address conflict in the logical address conflict detection process of FIG. 7, the HPD signal is reasserted on the HPD signal line of the HDMI cable 70 at step S14. As shown in FIG. 13, in such a case where the wireless node device 20 detects the logical address conflict when receiving the CEC message 190 from the HDMI device 40, the CEC message 190 is not transmitted to the HDMI device 30. Further, the HDMI device 40 executes the logical address allocation process, and the logical address of the HDMI device 40 is changed so as to resolve the logical address conflict.

Figure 14:
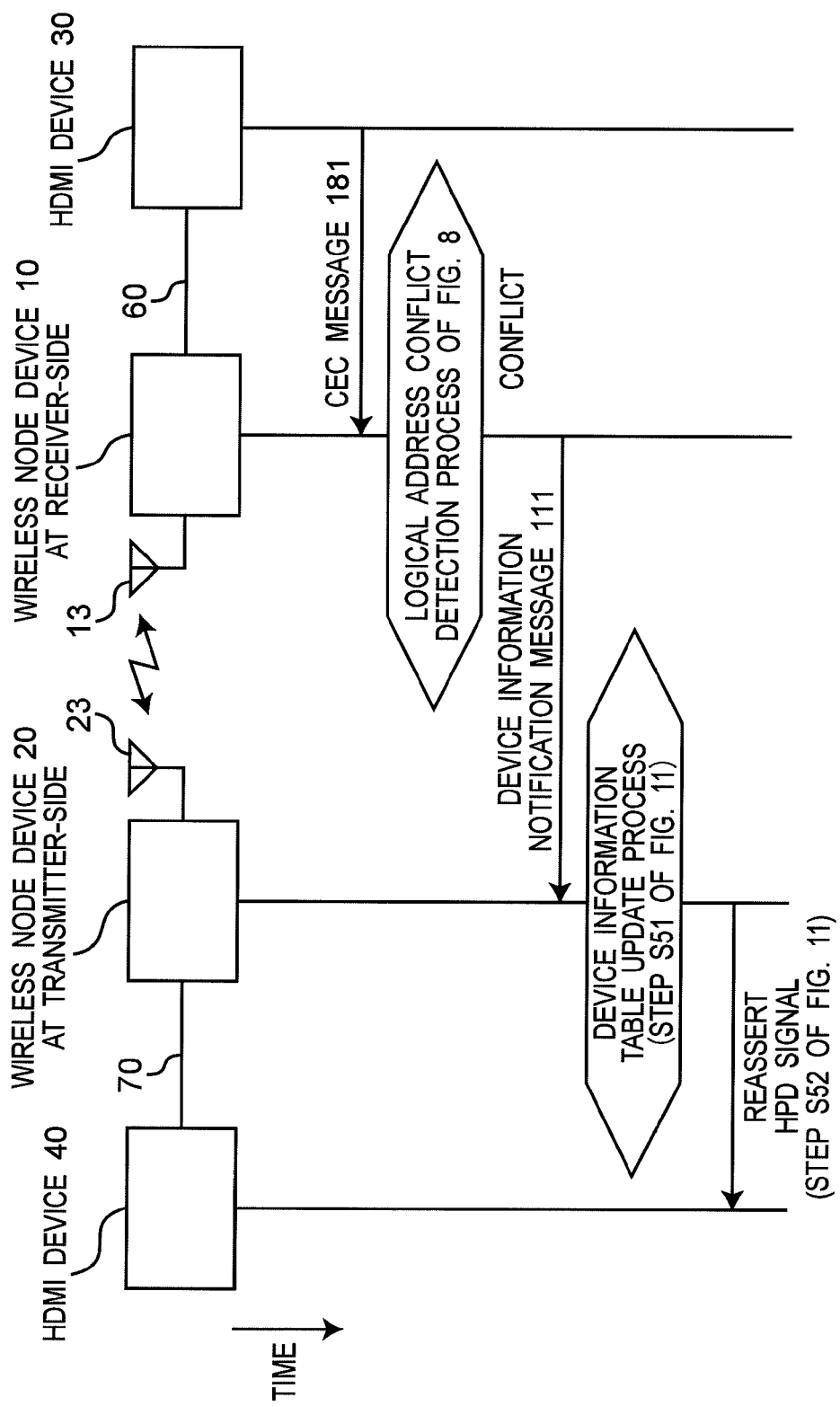
FIG. 14 is a sequence diagram showing an example of a message sequence in such a case where the logical address conflict is detected when the wireless node device 10 of FIG. 1 receives a CEC message 181 from an HDMI device 30.

FIG. 14 is a sequence diagram showing an example of a message sequence in such a case where the logical address conflict is detected when the wireless node device 10 of FIG. 1 receives the CEC message 181 from the HDMI device 30. Referring to FIG. 14, in the CEC message receiving process of FIG. 8, the wireless node device 10 receives the CEC message 181 from the HDMI device 30, and executes the logical address conflict detection process. When the logical address conflict is detected in the logical address conflict detection process, the device information notification message 111 is generated and wirelessly transmitted to the wireless node device 20. The device information notification message 111 is wirelessly received by the wireless node device 20 in the device information notification message receiving process of FIG. 11, and the device information table 14t is updated. Further, at step S52, the HPD signal is reasserted on the HPD signal line of the HDMI cable 70. As shown in FIG. 14, in such a case where the logical address conflict is detected when the wireless node device 10 receives the CEC message 181 from the HDMI device 30, the CEC message 181 is not transmitted to the HDMI device 40. Further, the HDMI device 40 executes the logical address allocation process so as to change the logical address of the HDMI device 40, and the logical address conflict is resolved.

Figure 15:
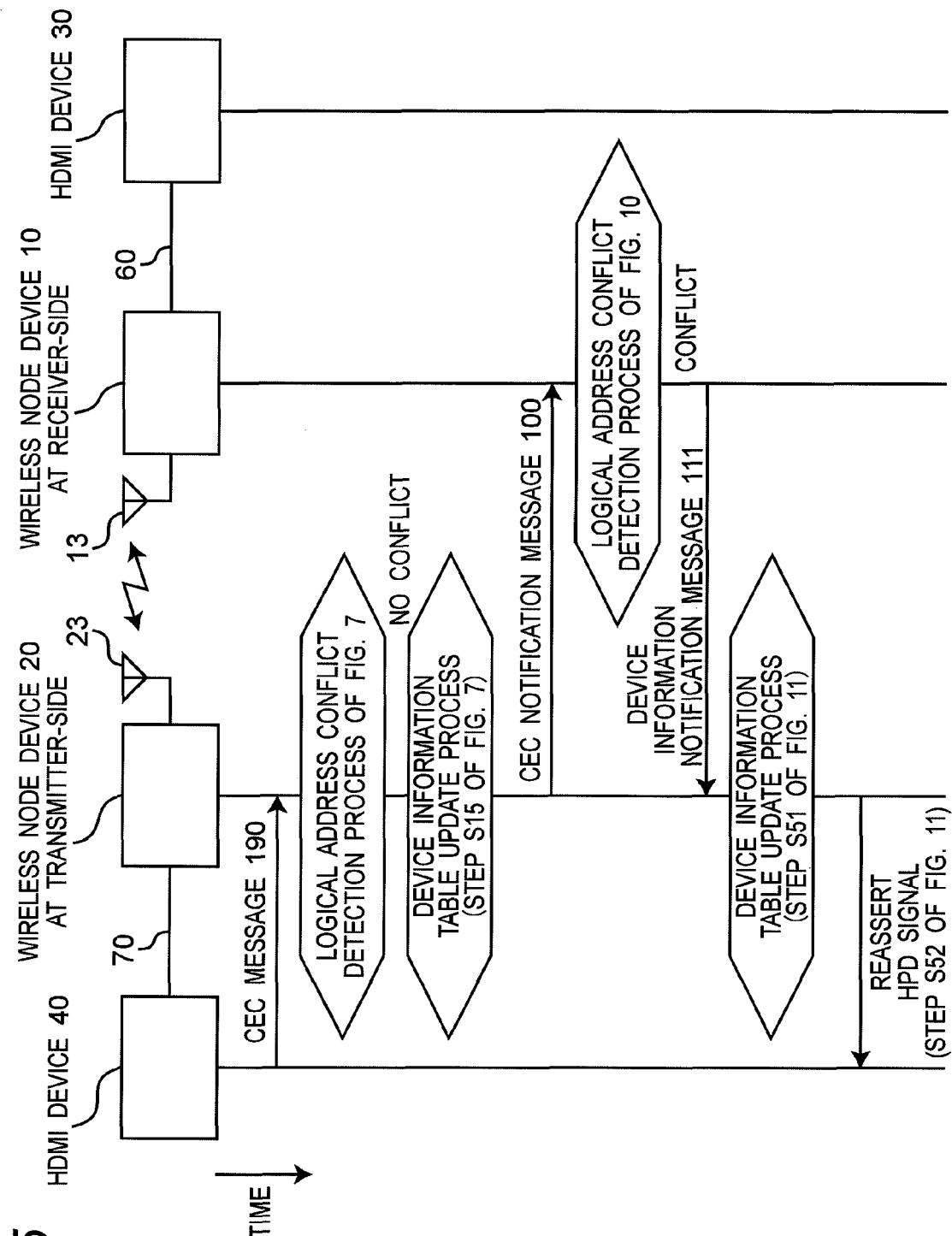
FIG. 15 is a sequence diagram showing an example of a message sequence in such a case where the logical address conflict is detected when the wireless node device 10 of FIG. 1 receives a CEC notification message 100 from the wireless node device 20.

FIG. 15 is a sequence diagram showing an example of a message sequence in such a case where the logical address conflict is detected when the wireless node device 10 of FIG. 1 receives the CEC notification message 100 from the wireless node device 20. The wireless node device 10 wirelessly receives the CEC notification message 100 in the CEC notification message receiving process of FIG. 10, and executes the logical address conflict detection process. When the logical address conflict is detected in the logical address conflict detection process, the device information notification message 111 is generated and wirelessly transmitted to the wireless node device 20. The device information notification message 111 is wirelessly received by the wireless node device 20 in the device information notification message receiving process of FIG. 11, and the device information table 14t is updated. Further, at step S52, the HPD signal is reasserted on the HPD signal line of the HDMI cable 70. As shown in FIG. 15, in such a case where the logical address conflict is detected when the wireless node device 10 receives the CEC notification message 100 from the wireless node device 20, the CEC message 190 is not transmitted to the HDMI device 30. Further, the HDMI device 40 executes the logical address allocation process so as to change the logical address of the HDMI device 40, and the logical address conflict is resolved.

Figure 16:
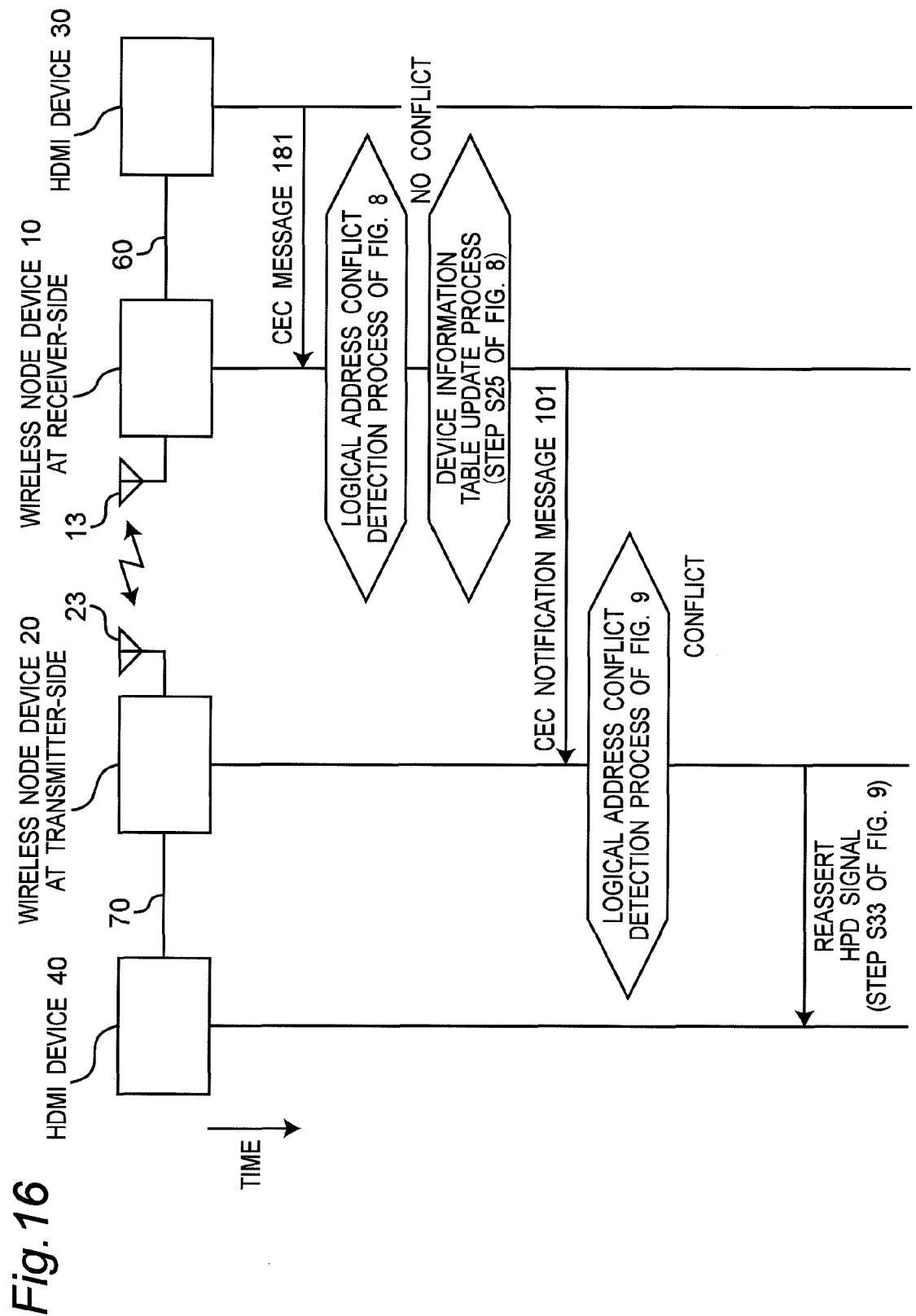
FIG. 16 is a sequence diagram showing an example of a message sequence in such a case where the logical address conflict is detected when the wireless node device 20 of FIG. 1 receives a CEC notification message 101 from the wireless node device 10.

FIG. 16 is a sequence diagram showing an example of a message sequence in such a case where the logical address conflict is detected when the wireless node device 20 of FIG. 1 receives the CEC notification message 101 from the wireless node device 10. Referring to FIG. 16, in the CEC message receiving process of FIG. 8, the wireless node device 10 receives the CEC message 181 from the HDMI device 30, and executes the logical address conflict detection process. When the logical address conflict is not detected in the logical address conflict detection process, the device information table 14t is updated at step S25. Further, at step S26, the CEC notification message 101 is generated and wirelessly transmitted to the wireless node device 20 to the wireless node device 20.

In the CEC notification message receiving process of FIG. 9, the wireless node device 20 wirelessly receives the CEC notification message 101, and executes the logical address conflict detection process. When the logical address conflict is detected in the logical address conflict detection process, the HPD signal is reasserted on the HPD signal line of the HDMI cable 70 at step S33. As shown in FIG. 16, in such a case where the logical address conflict is detected when the wireless node device 20 receives the CEC notification message 101 from the wireless node device 10, the CEC message 181 is not transmitted to the HDMI device 40. Further, the HDMI device 40 executes the logical address allocation process so as to change the logical address of the HDMI device 40, and the logical address conflict is resolved.

Figure 17:
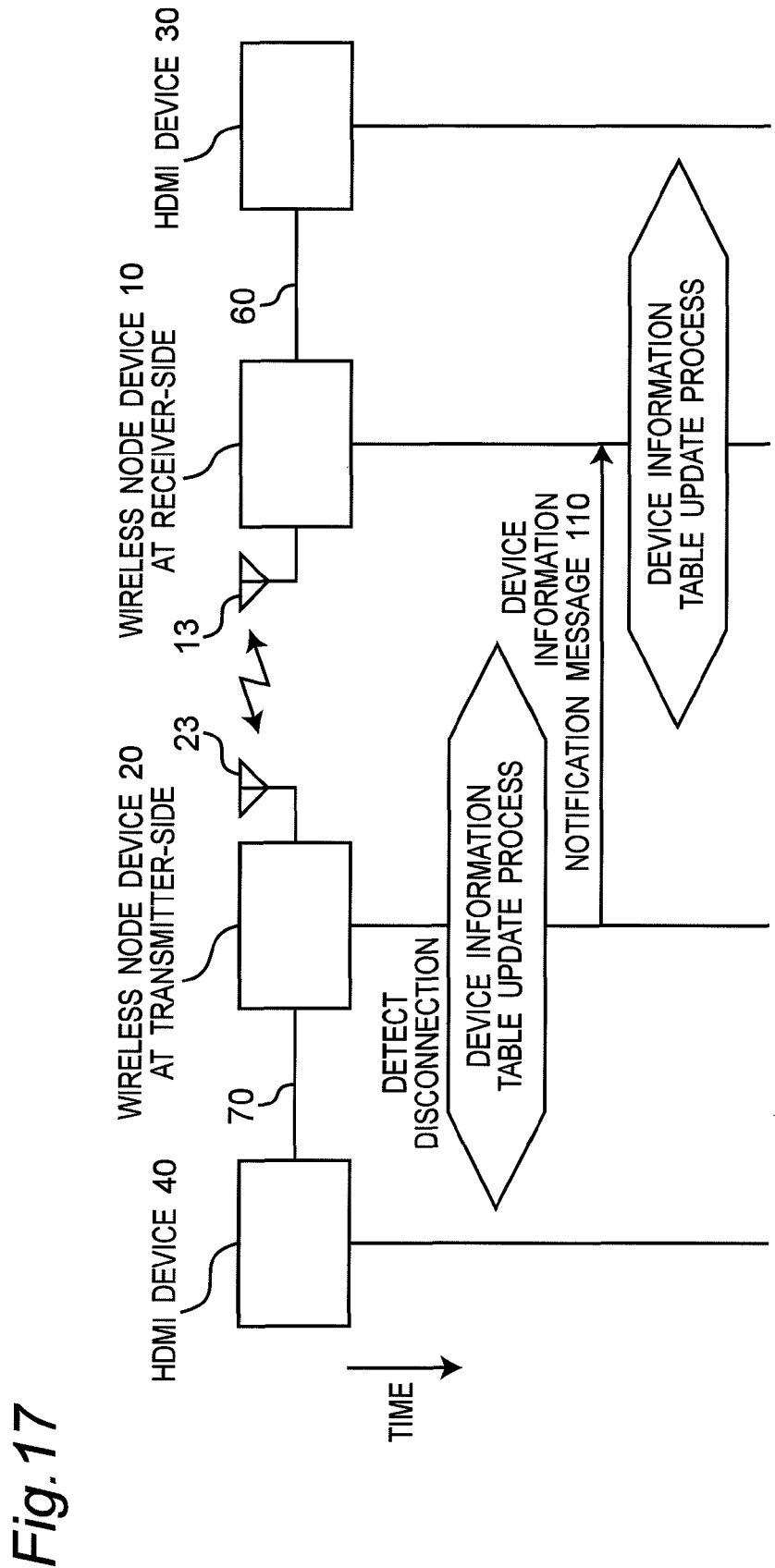
FIG. 17 is a sequence diagram showing an example of a message sequence in such a case where disconnection of the HDMI device 40 is detected by the wireless node device 20 of FIG. 1.

FIG. 17 is a sequence diagram showing an example of a message sequence in such a case where disconnection of the HDMI device 40 is detected by the wireless node device 20 of FIG. 1. The wireless node device 20 detects whether or not one of the HDMI devices in the HDMI cluster 90 is disconnected from the HDMI cluster 90 by determining whether or not the wireless node device 20 receives an ACK signal in response to the polling message or not. Upon detecting the disconnection, the wireless node device 20 executes a device information table update process of deleting the logical address of the disconnected HDMI device from the device information table 24t. Further, the wireless node device 20 generates the device information notification message 110 including data in the device information table 24t from which the logical address of the disconnected HDMI device is deleted, and wirelessly transmits the device information notification message 110 to the other wireless node devices including the wireless node device 10. In response to this, the wireless node device 10 compares data in the device information table 14t with the data in the device information table 24t included in the received device information notification message 110, and executes a device information table update process of deleting the logical address that is not included in the device information table 24t from the device information table 14t of the wireless node device 10 itself.

In a manner similar to above, the wireless node device 10 detects whether or not one of the HDMI devices in the HDMI cluster 80 is disconnected from the HDMI cluster 80 by determining whether or not the wireless node device 10 receives an ACK signal in response to the polling message or not. Upon detecting the disconnection, the wireless node device 10 executes the device information table update process of deleting the logical address of the disconnected HDMI device from the device information table 14t. Further, the wireless node device 10 generates the device information notification message 111 including data in the device information table 14t from which the logical address of the disconnected HDMI device is deleted, and wirelessly transmits the device information notification message 111 to the other wireless node devices including the wireless node device 20. In response to this, the wireless node device 20 compares data in the device information table 24t with the data in the device information table 14t included in the received device information notification message 111, and executes the device information table update process of deleting the logical address that is not included in the device information table 14t from the device information table 24t of the wireless node device 20 itself.

Figure 18:
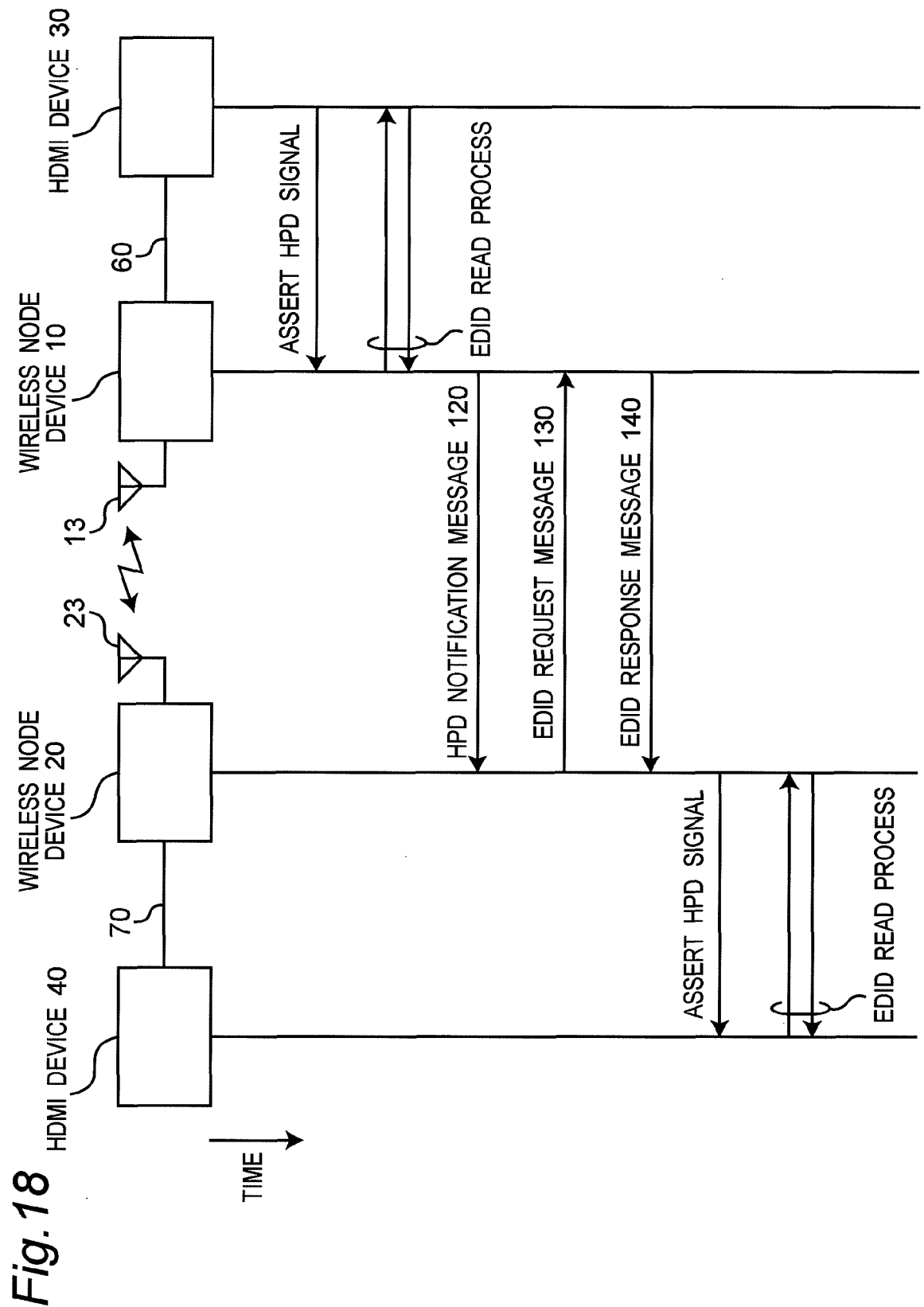
FIG. 18 is a sequence diagram showing an example of a message sequence when the HDMI device 40 of FIG. 1 acquires EDID of the HDMI device 30.

Next, there will be described a method of transmitting the EDID from the HDMI device 30 to the HDMI device 40. FIG. 18 is a sequence diagram showing an example of a message sequence when the HDMI device 40 of FIG. 1 acquires the EDID of the HDMI device 30. In this case, the EDID includes at least one of video output formats and at least one of audio output formats of the HDMI device 30.

Upon detecting that the HPD signal is asserted on the HPD signal line of the HDMI cable 60, the wireless node device 10 reads the EDID of the HDMI device 30 by an EDID read process specified in the HDMI. Then, the wireless node device 10 generates the HPD notification message 120 indicating the detection of the assertion of the HPD signal, and wirelessly transmits the HPD notification message 120 to the other wireless node device 20, which establishes the pass-through connection to the wireless node device 10. It is to be noted that the HPD notification message 120 includes data of an H bit indicating detection of assertion or de-assertion of the HPD signal. The H bit is set to 1 when assertion of the HPD signal is detected, and is set to 0 when de-assertion of the HPD signal is detected. In addition, the wireless node device 10 identifies the wireless node devices that establish the pass-through connection to the wireless node device 10 with referring to the connection information memory 15. In response to the HPD notification message 120 indicating the detection of the assertion of the HPD signal, the wireless node device 20 wirelessly transmits an EDID request message 130 for requesting the wireless node device 10, which is a source of the HPD notification message 120, to transmit the EDID to the wireless node device 10. In response to this, the wireless node device 10 wirelessly transmits an EDID response message 140 including the EDID read from the HDMI device 30 to the wireless node device 20. In response to this, the wireless node device 20 stores data of the EDID included in the EDID response message 140 in an EDID memory (not shown) of the wireless node device 20. In addition, the wireless node device 20 asserts the HPD signal on the HPD signal line of the HDMI cable 70 when preparation of reading the EDID is completed. In response to this, the HDMI device 40 reads the EDID stored in the EDID memory of the wireless node device 20 by the EDID read process specified in the HDMI. Therefore, the EDID of the HDMI device 30 is transmitted to the HDMI device 40.

On the other hand, upon detecting that the HPD signal is de-asserted on the HPD signal line of the HDMI cable 60, the wireless node device 10 wirelessly transmits the HPD notification message 120 indicating the detection of the de-assertion of the HPD signal (and in which the H bit is set to 0) to the wireless node device 20, which establishes the pass-through connection to the wireless node device 10. In response to this, the wireless node device 20 de-asserts the HPD signal on the HPD signal line of the HDMI cable 70. It is to be noted that the other DDC messages such as HDCP-related messages are terminated in the wireless node device, and not transmitted to the wireless channel.

Figure 19:
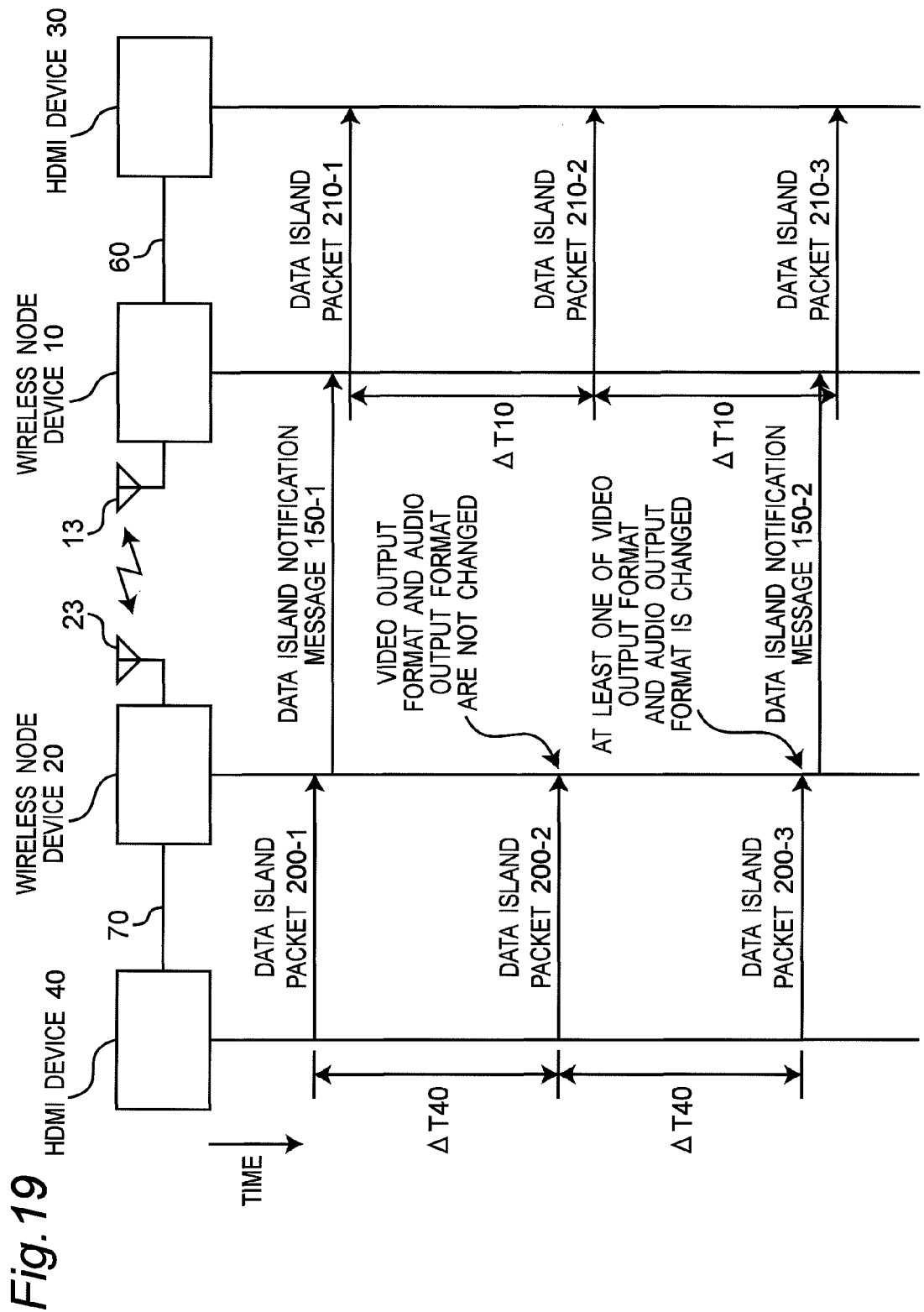
FIG. 19 is a sequence diagram showing a method of transmitting data island notification messages 150-1 and 150-2 in the wireless communication system of FIG. 1.

Next, there will be described a method of transmitting data island packets from the HDMI device 40 to the HDMI device 30. FIG. 19 is a sequence diagram showing a method of transmitting the data island notification messages 150-1 and 150-2 in the wireless communication system of FIG. 1.

Referring to FIG. 19, the HDMI device 40 generates video data in a predetermined video output format, and generates audio data in a predetermined audio output format. In this case, the video output format and the audio output format are selected from among, for example, the video output formats and the audio output formats included in the EDID of the HDMI device 30 acquired by the message sequence of FIG. 18. In addition, in the HDMI device 40, the video output format for generating the video data and the audio output format for generating the audio data temporally change according to, for example, an instruction from the user input device 43. Upon generating the TMDS signal that includes the video data, the audio data, the video output format and the audio output format, the HDMI device 40 provides the data island periods with the TMDS signal with a time cycle of ΔT40. In addition, data island packets 200-1, 200-2, 200-3 are inserted into the data island periods, respectively. Each of the data island packets 200-1, 200-2, 200-3 includes the AVI infoFrame packet including the video output format, and the audio infoFrame packet including the audio output format. In this case, the video output format and the audio output format temporally change as stated above in the HDMI device 40, and the AVI infoFrames and the audio infoFrames inserted into the respective data island packets 200-1, 200-2, 200-3, . . . temporally change accordingly.

Upon receiving the TMDS signal from the HDMI device 40, the wireless node device 20 sequentially extracts the data island packets 200-1, 200-2, 200-3, . . . from the TMDS signal. Upon receiving the data island packet 200-1, the wireless node device 20 compares the video output format included in the data island packet 200-1 to be processed with the video output format included in the data island packet received prior to the data island packet 200-1. When the video output format included in the data island packet 200-1 to be processed is different from the video output format included in the data island packet received prior to the data island packet 200-1, the wireless node device 20 inserts the AVI infoFrame included in the data island packet 200-1 into the data island notification message 150-1. Further, the wireless node device 20 compares the audio output format included in the data island packet 200-1 to be processed with the audio output format included in the data island packet received prior to the data island packet 200-1. When the audio output format included in the data island packet 200-1 to be processed is different from the audio output format included in the data island packet received prior to the data island packet 200-1, the wireless node device 20 inserts the audio infoFrame included in the data island packet 200-1 into the data island notification message 150-1. Then, the wireless node device 20 wirelessly transmits the data island notification message 150-1 to the wireless node device 10, which establishes the pass-through connection to the wireless node device 20. In this case, when the video output format and the audio output format included in the data island packet 200-1 to be processed are the same as corresponding output formats included in the data island packet received prior to the data island packet 200-1 to be processed, the wireless node device 20 prohibits transmission of the data island notification message 150-1. It is to be noted that the wireless node device 20 determines whether or not the pass-through connection is established between the wireless node devices 20 and 10 with referring to the connection information memory 25.

Referring to FIG. 19, after receiving the data island packet 200-2, the wireless node device 10 detects that the video output format and the audio output format included in the data island packet 200-2 are not changed from those included in the data island packet 200-1, and does not wirelessly transmit the data island notification message. On the other hand, after receiving the data island packet 200-3, the wireless node device 10 detects that at least one of the video output format and the audio output format included in the data island packet 200-3 is changed from the video output format or the audio output format included in the data island packet 200-2, and wirelessly transmits the data island notification message 150-2.

On the other hand, the wireless node device 10 generates the TMDS signal based on the video data and the audio data from the wireless node device 20 according to a method specified in the HDMI, and outputs the TMDS signal to the HDMI device 30. In this case, the wireless node device 10 provides the island periods with the TMDS signal with a time cycle of ΔT10. In the data island periods, the wireless node device 10 transmits data island packets 210-1, 210-2, 210-3, .. to the HDMI device 30 with the time cycle of ΔT10, respectively. Each of the data island packets 210-1, 210-2, 210-3 includes the AV infoFrame packet including the video output format transmitted from the wireless node device 20, and the audio infoFrame packet including the audio output format transmitted from the wireless node device 20. Upon wirelessly receiving the data island notification message 150-1, the wireless node device 10 changes the AVI infoFrame packet and the audio infoFrame packet included in the data island packet 210-1 to be transmitted next, to the AVI infoFrame packet and the audio infoFrame packet included in the data island notification message 150-1. In this case, when the data island packet 210-1 includes only the AVI infoFrame packet, the wireless node device 10 does not change the audio infoFrame packet included in the data island packet 210-1 to be transmitted next. When the data island packet 210-1 includes only the audio infoFrame packet, the wireless node device 10 does not change the AVI infoFrame packet included in the data island packet 210-1 to be transmitted next. Further, upon wirelessly receiving the data island notification message 150-2, the wireless node device 10 generates the data island packet 210-3, and transmits the data island packet 210-3 to the HDMI device 30 in a manner similar to that when the data island notification message 150-1 is received.

Each of the HDMI device 40 and the wireless node device 10 may insert the AVI infoFrame packet into the data island packet only at the time of starting transmitting the video data and at the time of changing the video output format, and may insert the audio infoFrame packet into the data island packet only at the time of starting transmitting the audio data and at the time of changing the audio output format. In this case, the wireless node device 20 receives data island packets each including at least one of the AVI infoFrame packet and the audio infoFrame packet, from the HDMI device 40 with the time cycle of ΔT40. Then, when at least one of the video output format and the audio output format included in the data island packet to be processed is different from the corresponding output format included in the data island packet received prior to the data island packet to be processed, the wireless node device 20 generates a data island notification message including an infoFrame packet corresponding to the output format which is included in the data island packet to be processed and is different from the corresponding output format included in the data island packet received prior to the data island packet to be processed, and wirelessly transmits the data island notification message to the wireless node device 10. When the video output format and the audio output format included in the data island packet to be processed are the same as the corresponding output formats included in the data island packet received prior to the data island packet to be processed, the wireless node device 20 prohibits wireless transmission of the data island notification message.

Further, each of the HDMI device 40 and the wireless node device 10 may output a data island packet including data of the video output format and a data island packet including data of the audio output format with different time cycles, respectively.

Upon receiving a data island packet other than the AVI infoFrame packet or the audio infoFrame packet, the wireless node device 20 transmits a data island notification message including the received data island packet to the wireless node device 10.

Next, there will be described the CEC notification message transmitting process executed by each of the wireless node devices 10 and 20. It is to be noted that the CEC notification message transmitting process executed by the wireless node device 20 is similar to that executed by the wireless node device 10. Therefore, only the CEC notification message transmitting process executed by the wireless node device 10 will be described below. Upon receiving the CEC message 181 from the CEC bus of the HDMI cable 60, the wireless node device 10 generates at least one CEC notification sub-message from the received CEC message 181, and wirelessly transmits the CEC notification sub-message according to the following three rules.

1. When a message length of the CEC message 181 is equal to or smaller than 6 octets, the CEC message 181 is not divided but converted into a CEC notification sub-message to be described below, and the CEC notification sub-message is wirelessly transmitted.

2. When the message length of the CEC message 181 is equal to or larger than 7 octets and equal to or smaller than 11 octets, the CEC message 181 is divided into a group including the first 6 octets part thereof and a group including a remaining part thereof. The divided CEC messages 181 are converted into CEC notification sub-messages, to be described below, respectively, and wirelessly transmitted.

3. When the message length of the CEC message 181 is equal to or larger than 12 octets, the CEC message 181 is divided into a group including the first 6 octets part thereof, a group including the next 5 octets part thereof, and a group including a remaining part thereof. The divided CEC messages 181 are converted into CEC notification sub-messages, to be described below, respectively, and wirelessly transmitted.

Figure 23:
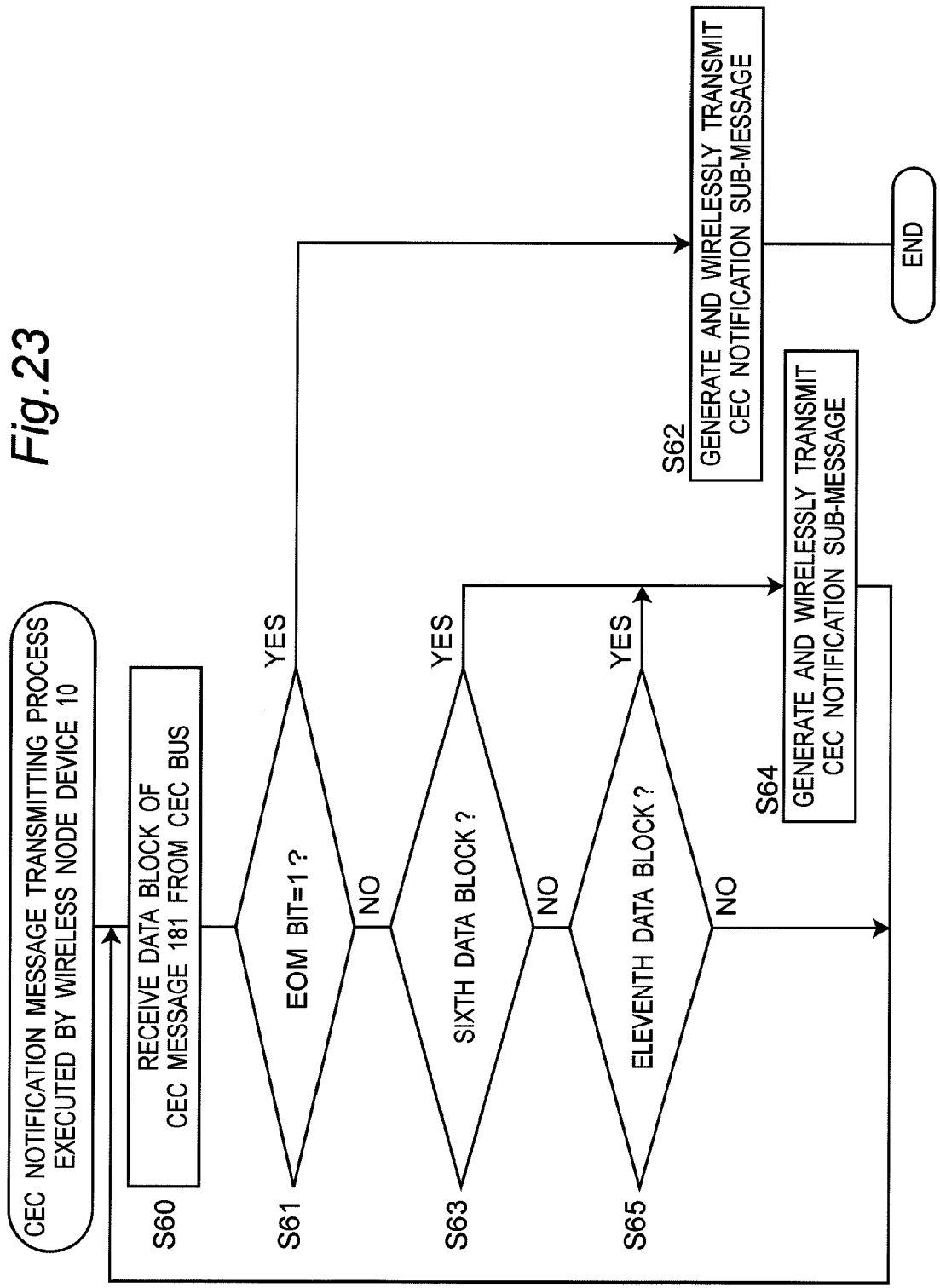
FIG. 23 is a flowchart showing a CEC notification message transmitting process executed by the wireless node device 10 of FIG. 1.

FIG. 23 is a flowchart showing the CEC notification message transmitting process executed by the wireless node device 10 of FIG. 1. At step S60, the wireless node device 10 receives a data block of the CEC message 181 from the CEC bus of the HDMI cable 60. Then, at step S61, the wireless node device 10 determines whether or not the EOM bit of the received data block is 1. If YES at step S60, the control flow goes to step S62. On the other hand, if NO at step S60, the control flow goes to step S63. At step S63, the wireless node device 10 determines whether or not the received data block is a sixth data block. If YES at step S63, the control flow goes to step S64. If NO at step S63, the control flow goes to step S65. At step S65, the wireless node device 10 determines whether or not the received data block is an eleventh data block or not. If YES at step S65, the control flow goes to step S64. If NO at step S65, the control flow returns to step S60 so as to wait for a next data block.

At step S62, the wireless node device 10 adds a wireless header to each data block, which is received from the CEC bus before step S62, not converted into a CEC notification sub-message, and is not wirelessly transmitted yet, and converts the data block into a CEC notification sub-message. In this case, the wireless node device 10 selects the wireless identifier of the wireless node device wirely connected to the logical address of the HDMI device 40, which is the destination of the CEC message 181, with referring to the device information table 14*t*, and sets the selected wireless identifier in a destination address region of the wireless header. Then, the wireless node device 10 wirelessly transmits the generated CEC notification sub-message to the destination wireless node device 20, and terminates the CEC notification message transmitting process. At step S64, in a manner similar to that of step S62, the wireless node device 10 converts each data block, which is received from the CEC bus before step S63, not converted into a CEC notification sub-message, and is not wirelessly transmitted yet into a CEC notification sub-message, and wirelessly transmits the CEC notification sub-message to the wireless node device 20. Then, the control flow returns to step S60 so as to wait for a next data block.

It is to be noted that the wireless node device 20 generates at least one CEC notification sub-message based on the CEC message 190 received from the CEC bus of the HDMI cable 70, and wirelessly transmits the CEC notification sub-message to the wireless node device 10 in a manner similar to that of the wireless node device 10.

FIG. 22 is an explanatory diagram showing an example of a format of each of the CEC messages 180, 181, 190 and 191 transmitted or received in the wireless communication system of FIG. 1, and an example of a format of each of the CEC notification messages 100 and 101 wirelessly transmitted or received in the wireless communication system of FIG. 1. As shown in FIG. 22, the CEC message 181 having the message length of 16 octets is divided into a group including data of the first 6 octets part thereof, a group including data of the next 5 octets part thereof, and a group including data of the last 5 octets part thereof. Wireless headers are added to the respective groups, respectively, and the groups with the wireless headers are converted into the CEC notification sub-messages 101-1, 101-2 and 101-3, respectively.

Figure 20:
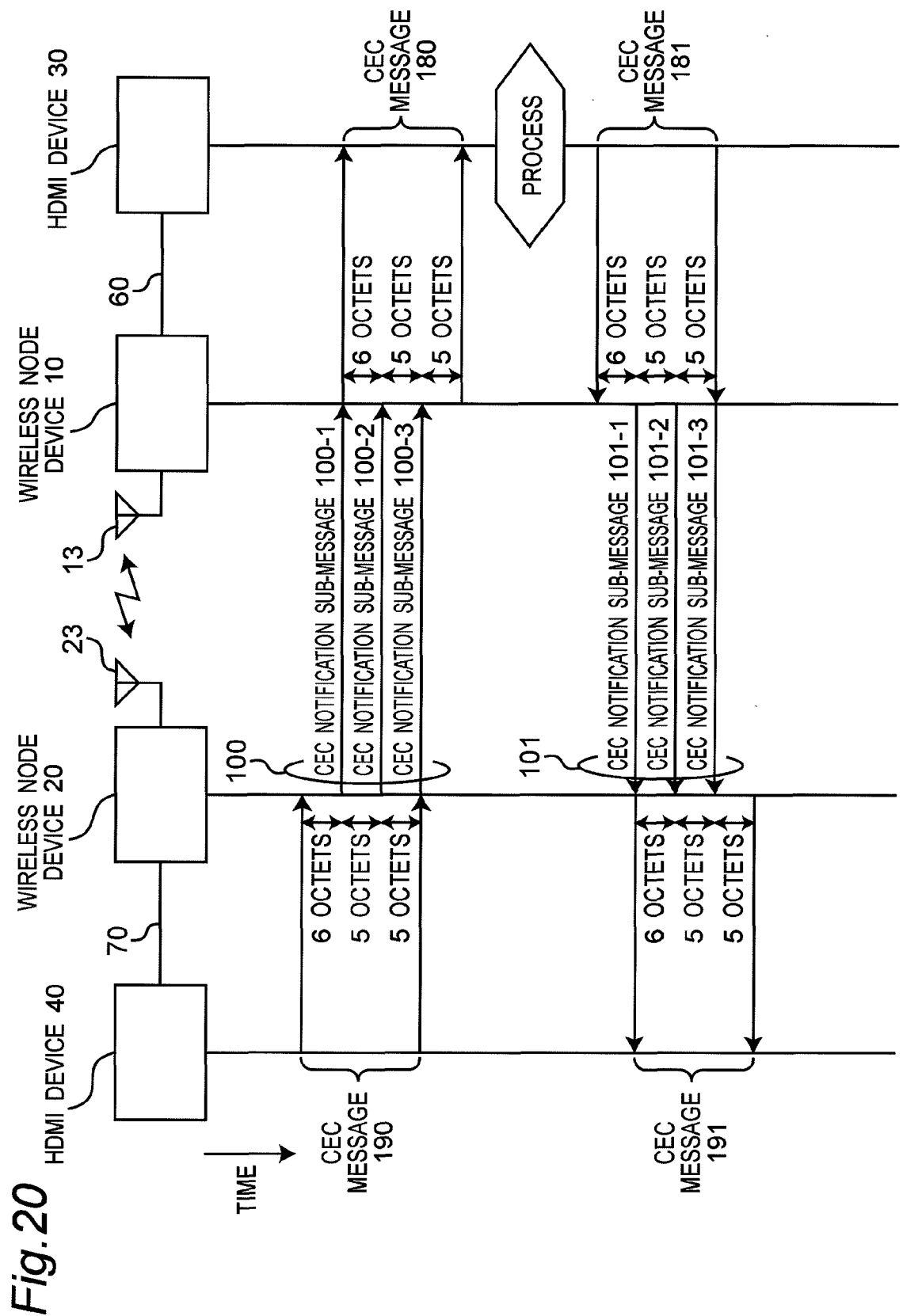
FIG. 20 is a sequence diagram showing an example of a message sequence when the HDMI device 40 transmits the CEC message 190 of 16 octets to the HDMI device 30 via the wireless node devices 20 and 10, and the HDMI device 30 transmits the CEC message 181 of 16 octets to the HDMI device 40 via the wireless node devices 10 and 20 in the wireless communication system of FIG. 1.

FIG. 20 is a sequence diagram showing an example of a message sequence when the HDMI device 40 transmits the CEC message 190 of 16 octets to the HDMI device 30 via the wireless node devices 20 and 10, and the HDMI device 30 transmits the CEC message 181 of 16 octets to the HDMI device 40 via the wireless node devices 10 and 20 in the wireless communication system of FIG. 1. First of all, the CEC message 190 generated by the HDMI device 40 is received by the wireless node device 20. Upon receiving up to the sixth octet of the CEC message 190, the wireless node device 20 generates the CEC notification sub-message 100-1 including data of the first to sixth octets of the CEC message 190, and wirelessly transmits the CEC notification sub-message 100-1 to the wireless node device 10. Upon receiving the CEC notification sub-message 100-1, the wireless node device 10 converts the CEC notification sub-message 100-1 into the CEC message 180, and transmits the CEC message 180 to the HDMI device 30. Next, upon receiving up to the eleventh octet of the CEC message 190 from the HDMI device 40, the wireless node device 20 generates the CEC notification sub-message 100-2 including data of the seventh to eleventh octets of the CEC message 190, and wirelessly transmits the CEC notification sub-message 100-2 to the wireless node device 10. Upon receiving the CEC notification sub-message 100-2, the wireless node device 10 converts the CEC notification sub-message 100-2 into the CEC message 180, and transmits the CEC message 180 to the HDMI device 30 subsequently to the transmission of the sixth octet of the CEC message 180. Next, upon receiving up to the sixteenth octet of the CEC message 190 from the HDMI device 40, the wireless node device 20 generates the CEC notification sub-message 100-3 including data of the twelfth to sixteenth octets of the CEC message 190, and wirelessly transmits the CEC notification sub-message 100-3 to the wireless node device 10. Upon receiving the CEC notification sub-message 100-3, the wireless node device 10 converts the CEC notification sub-message 100-3 into the CEC message 180, and transmits the CEC message 180 to the HDMI device 30 subsequently to the transmission of the eleventh octet of the CEC message 180. Upon receiving the CEC message 180, the HDMI device 30 executes a predetermined process according to the CEC message 180.

In a manner similar to that of the wireless node device 20, the wireless node device 10 divides the CEC message 181 having a message length of 16 octets from the HDMI device 30 into the CEC notification sub-messages 101-1, 101-2 and 101-3, and wirelessly transmits the CEC notification sub-messages 101-1, 101-2 and 101-3 to the wireless node device 20. In addition, in a manner similar to that of the wireless node device 10, the wireless node device 20 combines the wirelessly received CEC notification sub-messages 101-1, 101-2 and 101-3 into the CEC message 191, and transmits the CEC message 191 to the HDMI device 40.

Figure 21:
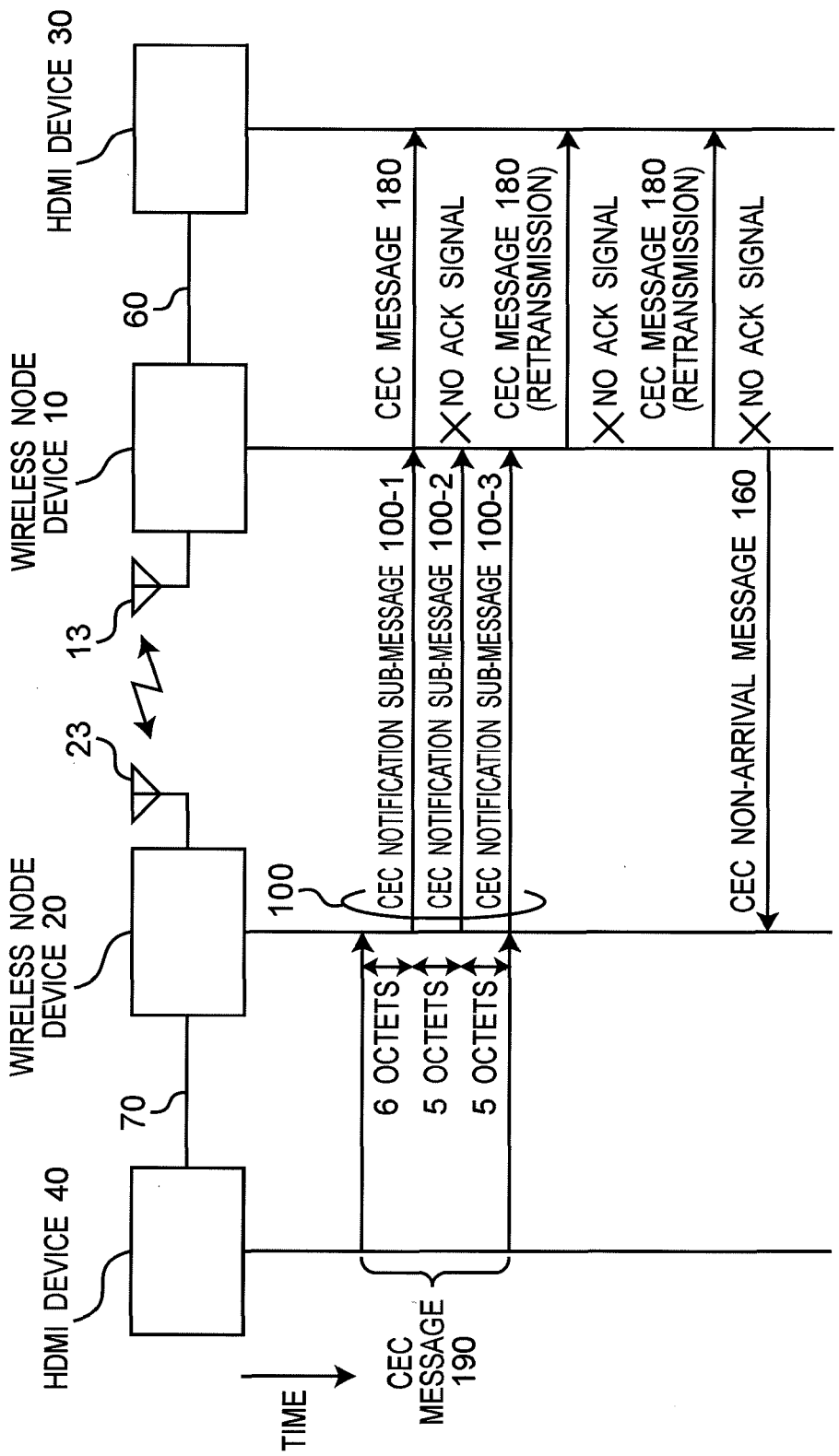
FIG. 21 is a sequence diagram showing an example of a message sequence when the HDMI device 40 transmits the CEC message 190 of 16 octets to the HDMI device 30 via the wireless node devices 20 and 10, and the wireless node device 10 cannot receive an ACK signal from the HDMI device 30 in the wireless communication system of FIG. 1.

FIG. 21 is a sequence diagram showing an example of a message sequence when the HDMI device 40 transmits the CEC message 190 of 16 octets to the HDMI device 30 via the wireless node devices 20 and 10, and the wireless node device 10 cannot receive an ACK signal from the HDMI device 30 in the wireless communication system of FIG. 1. Referring to FIG. 21, the wireless node device 10 converts the CEC notification sub-messages 100-1 to 100-3 wirelessly received from the wireless node device 20 into the CEC message 180. Next, the wireless node device 10 divides the CEC message 180 into data blocks each having the data length of one octet, and transmits the data blocks to the HDMI device 30. Each time when the HDMI device 30 normally receives a data block, the HDMI device 30 transmits back an ACK signal to the wireless node device 10. When the wireless node device 10 does not receive any ACK signal in response to each data block of the CEC message 180 from the HDMI device 30, the wireless node device 10 retransmits the CEC message 180 to the HDMI device 30. When the wireless node device 10 does not receive any ACK signal in response to each data block of the retransmitted CEC message 180 from the HDMI device 30, the wireless node device 10 wirelessly transmits the CEC non-arrival message 160, which indicates that the wireless node device 10 cannot transmit the CEC message 180 to the HDMI device 30, to the wireless node device 20. In response to this, the wireless node device 20 deletes data corresponding to the HDMI device 30 from the device information table 24t.

Referring to FIG. 21, the maximum number of times of the retransmission of the CEC message 180 by the wireless node device 10 is set to two. However, the present invention is not limited to this, and the wireless node device 10 may not retransmit the CEC message 180 or retransmit the CEC message 180 three or more times. In addition, referring to FIG. 21, there is described such a case of transmitting the CEC message 190 from the HDMI device 40 to the HDMI device 30. Conversely, when the CEC message 181 is transmitted from the HDMI device 30 to the HDMI device 40, the wireless node device 20 also generates the CEC non-arrival message 160 in a manner similar to that of the wireless node device 10.

Figure 24:
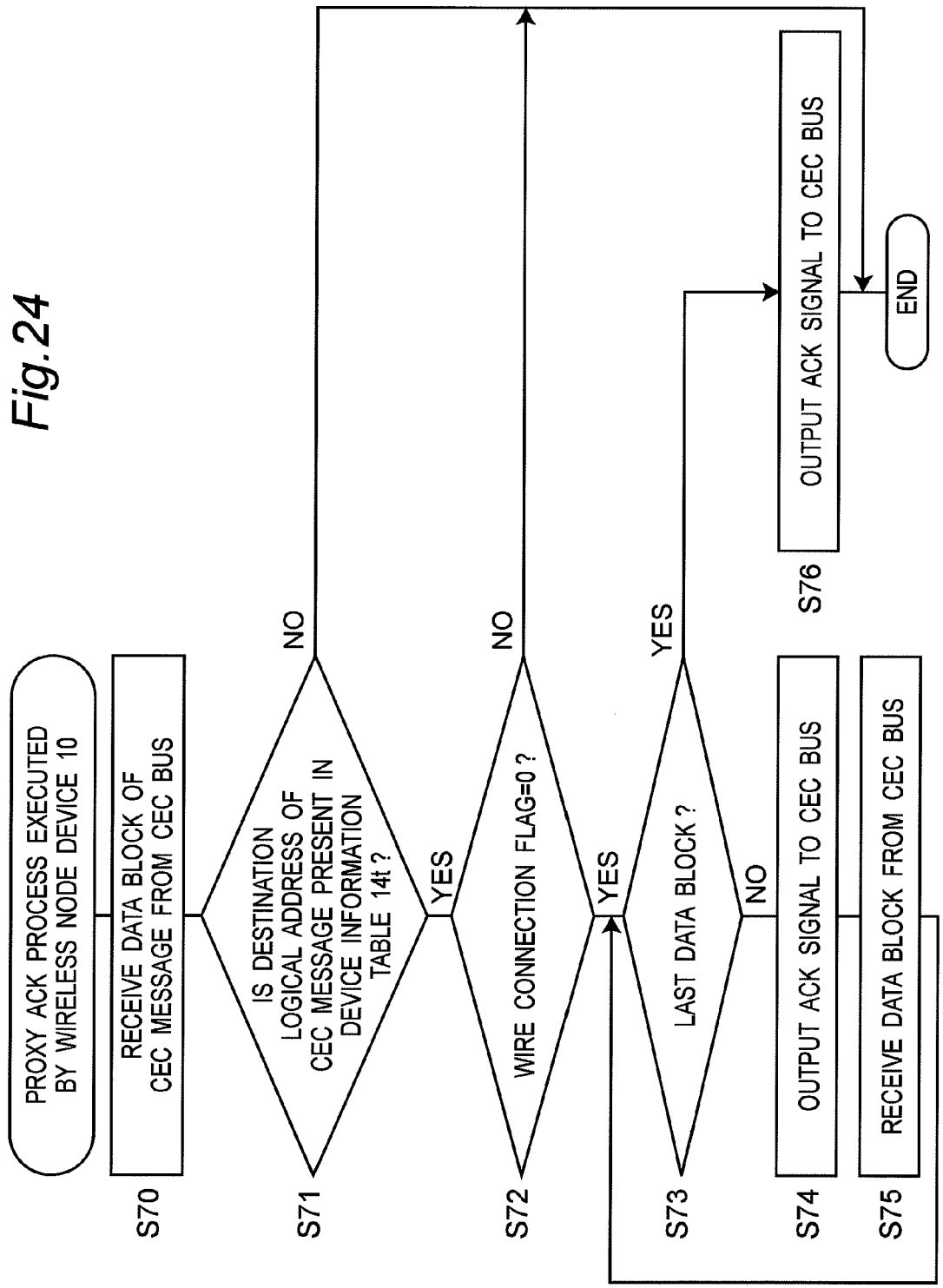
FIG. 24 is a flowchart showing a proxy ACK process executed by the wireless node device 10 of FIG. 1.

FIG. 24 is a flowchart showing a proxy ACK process executed by the wireless node device 10 of FIG. 1. At step S70, the wireless node device 10 receives a data block of the CEC message from the CEC bus of the HDMI cable 60. Next, at step S71, the wireless node device 10 determines whether or not a logical address of a destination HDMI device of the CEC message is present in the device information table 14t. If YES at step S71, the control flow goes to step S72. On the other hand, if NO at step S71, the wireless node device 10 terminates the proxy ACK process without transmitting back any ACK signal. At step S72, the wireless node device 10 determines whether or not a wire connection flag of the destination HDMI device is zero with referring to the device information table 14t. If YES at step S72, the control flow goes to step S73. On the other hand, if NO at step S72, the wireless node device 10 terminates the proxy ACK process without transmitting back any ACK signal. At step S73, the wireless node device 10 determines whether or not the received data block is the last data block. If YES at step S73, the wireless node device 10 outputs an ACK signal to the CEC bus at step S76, and terminates the proxy ACK process. On the other hand, if NO at step S73, the control flow goes to step S74. After outputting an ACK signal to the CEC bus at step S74, the wireless node device 10 receives a next data block from the CEC bus at step S75, and the control flow returns to step S73.

According to the proxy ACK process of FIG. 24, upon receiving the CEC message 181 from the HDMI device 30 present in the HDMI cluster 80, which is the same as the cluster including the wireless node device 10, the wireless node device 10 determines whether or not the destination logical address of the CEC message 181 is present in the device information table 14t, and whether or not the destination logical address of the CEC message 181 is present in the HDMI cluster 80 (namely, whether or not the wire connection flag corresponding to the destination logical address of the CEC message 181 is set to 1). When the destination logical address of the CEC message 181 is present in the device information table memory 14, and when the HDMI device having the destination logical address of the CEC message 181 is not present in the HDMI cluster 80 (namely, when the wire connection flag corresponding to the destination logical address of the CEC message 181 is set to 0), it is determined whether or not the received data block is the last data block. Then, when the received data block is not the last data block, the wireless node device 10 transmits back an ACK signal in response to the CEC message as proxy for the destination HDMI device of the CEC message 181, and then awaits until a next data block is inputted from the CEC bus. Upon receiving the last data block, the wireless node device 10 transmits back the ACK signal in response to the CEC message as proxy for the destination HDMI device of the CEC message 181, and then terminates the proxy ACK process.

The wireless node device 10 terminates the proxy ACK process, when the logical address of the destination HDMI device of the received CEC message 181 is not present in the HDMI 80 cluster (namely, the wire connection flag corresponding to the destination logical address of the CEC message 181 is set to 0), or when the destination address of the CEC message is not present in the device information table memory 14.

In this case, there has been described the proxy ACK process in the case where the wireless node device 10 receives the CEC message 181 from the HDMI device 30 present in the HDMI cluster 80, which is the same as the cluster including the wireless node device 10. However, the wireless node device 10 operates in a manner similar to the above-described manner when the wireless node device 10 receives a CEC message from an HDMI device other than the HDMI device 30 and present in the HDMI cluster 80. In addition, the wireless node device 20 also executes the proxy ACK process of FIG. 24 in a manner similar to that of the wireless node device 10.

Figure 25:
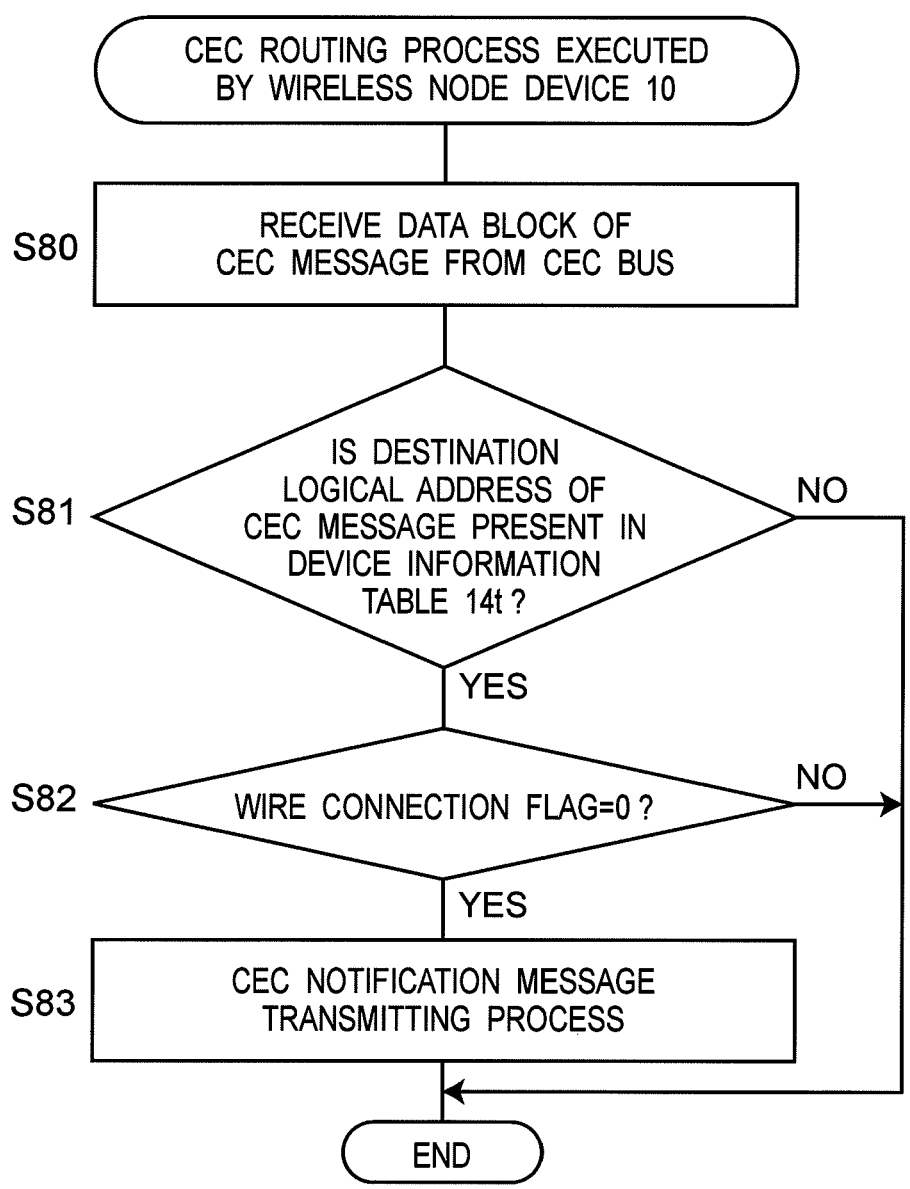
FIG. 25 is a flowchart showing a CEC routing process executed by the wireless node device 10 of FIG. 1.

FIG. 25 is a flowchart showing a CEC routing process executed by the wireless node device 10 of FIG. 1. At step S80, the wireless node device 10 receives a data block of the CEC message from the CEC bus of the HDMI cable 60. Next, at step S81, it is determined whether or not the logical address of the destination HDMI device of the CEC message is present in the device information table 14t. If YES at step S81, the control flow goes to step S82. On the other hand, if NO at step S82, the wireless node device 10 terminates the CEC routing process. At step S82, the wireless node device 10 determines whether or not the wire connection flag of the destination HDMI device is zero with referring to the device information table 14t. If YES at step S82, the control flow goes to step S83. On the other hand, if NO at step S82, the wireless node device 10 terminates the CEC routing process. At step S83, the wireless node device 10 executes the CEC notification message transmitting process of FIG. 23, and terminates the CEC routing process.

According to the CEC routing process of FIG. 25, upon receiving the CEC message from the CEC bus, at steps S80 and S81, the wireless node device 10 determines whether or not the destination device of the CEC message is present in the HDMI cluster 80, in which the wireless node device 10 itself present. When the destination device of the received CEC message is present in the HDMI cluster 80, in which the wireless node device 10 itself present (namely, when the wire connection flag is 1), the received CEC message is not transmitted to the wireless interface. Otherwise, the received CEC message is transmitted to the wireless interface.

According to the CEC routing process of FIG. 25, upon receiving the CEC message from the CEC bus, at steps S80 and S81, the wireless node device 10 determines whether or not the destination device of the CEC message is present in the HDMI cluster 80, in which the wireless node device 10 itself present. When the destination device of the received CEC message is not present in the HDMI cluster 80, in which the wireless node device 10 itself present (namely, when the wire connection flag is 0), it is determined whether or not the destination logical address is the broadcast address. When the destination logical address is not the broadcast address, the received CEC message is not outputted to the HDMI cluster 80. When the destination device of the received CEC message is present in the same HDMI cluster 80, or when the destination logical address is the broadcast address, the received CEC message is outputted to the HDMI cluster 80.

In this case, the CEC routing process executed by the wireless node device 10 has been described. However, the wireless node device 20 also executes the CEC routing process in a manner similar to that of the wireless node device 10.

As described above in detail, the wireless node device 20 according to the present embodiment receives the data island packets each including at least one of the video output format and the audio output format from the HDMI device 40 with the time cycle of ΔT40. Further, when the video output format and the audio output format included in the data island packet to be processed are the same as the corresponding output formats included in the data island packet received prior to the data island packet to be processed, the wireless node device 20 prohibits the wireless transmission of the data island notification message. Therefore, it is possible to wirelessly transmit the video data and the audio data between the wireless node devices 10 and 20 more efficiently than the prior art, without consuming a wireless transmission band between the wireless node devices 10 and 20.

In addition, the wireless node device 10 according to the present embodiment periodically transmits the data island packets each including at least one of the video output format and the audio output format to the HDMI device 30. Upon receiving the data island notification message including at least one of the video output format and the audio output format from the wireless device, the wireless node device 10 changes the video output format included in the data island packet to the video output format included in the data island notification message, and changes the audio output format included in the data island packet to the audio output format included in the data island notification message. Therefore, by using the wireless node device 10 together with the wireless node device 20, it is possible to wirelessly transmit the video data and the audio data between the wireless node devices 10 and 20 more efficiently than the prior art.

In the above-described embodiment, the HDMI cluster 80 is configured to include one HDMI device 40, and the HDMI cluster 90 is configured to include one HDMI device 30. However, the present invention is not limited to this, and the HDMI cluster 80 may include a plurality of HDMI devices such as another HDMI device connected to the HDMI device 40 using an HDMI cable, and another HDMI device connected to the wireless node device 20 using an HDMI cable. In addition, the HDMI cluster 90 may include a plurality of HDMI devices such as another HDMI device connected to the HDMI device 30 using an HDMI cable, and another HDMI device connected to the wireless node device 10 using an HDMI cable. Further, referring to FIG. 1, the wireless communication system may be configured to include a plurality of HDMI clusters each configured in a manner similar to that of the HDMI cluster 80 or 90.

In the CEC notification message transmitting process (FIG. 23) according to the present embodiment, the CEC message having the message length of 16 octets is divided into three groups having message lengths of 6 octets, 5 octets and 5 octets, respectively. However, the present invention is not limited to this. Preferably, the CEC message is divided into groups. In this case, a message length of the first group is set to be the longest, and message lengths of the following groups are set to be equal to or smaller than the message length of the previous group, respectively. Then, the respective divided CEC messages are converted into the CEC notification sub-messages, respectively, and the CEC notification sub-messages are wirelessly transmitted. Therefore, it is possible to start transmitting the CEC message to the CEC bus when the wireless node device at the receiver side receives the first CEC notification sub-message. When the CEC message is not divided as stated above, the wireless node device at the receiver side can transmit the CEC message to the CEC bus after waiting for a predetermined time after receiving the first CEC notification sub-message.

In addition, in the above-described embodiment, the HDMI device 40 outputs the TMDS signal including the video data and the audio data to the wireless node device 20. However, the present invention is not limited to this, and the HDMI device 40 may output a TMDS signal including the video data or the audio data to the wireless node device 20.

Industrial Applicability

As described above in detail, according to the wireless communication device of the first invention, when at least one of the video output format and the audio output format included in the packet to be processed is different from a corresponding output format included in a packet received prior to the packet to be processed, the controller means generates a first message signal including an output format which is included in the packet to be processed and is different from the corresponding output format included in the packet received prior to the packet to be processed, and wirelessly transmits the first message signal to the wireless receiver device. When the video output format and the audio output format included in the packet to be processed are the same as corresponding output formats included in the packet received prior to the packet to be processed, the controller means prohibits wireless transmission of the first message. In addition, according to the wireless communication device of the second invention, upon wirelessly receiving a first message signal including at least one of the video output format and the audio output format, the controller means changes the video output format included in the packet to the video output format included in the first message signal, and changes the audio output format included in the packet to the audio output format included in the first message signal. Therefore, it is possible to wirelessly transmit a content signal more efficiently than the prior art, without consuming a wireless transmission band.

The wireless communication devices according to first and second aspects of the present invention are useful as wireless node devices employed in, for example, an AV system or the like wirelessly transmitting a video signal and the like reproduced and outputted by a source device such as a DVD player to a sink device such as a television receiver in an uncompressed fashion.

The invention claimed is:

1. A wireless communication device comprising:
a wire communication circuit configured to receive via a wire transmission line from a wire transmitter device, a packet including at least one of a video output format of video data and an audio output format of audio data;
a controller configured to generate a wireless packet based on the packet received by the wire communication circuit; and
a wireless communication circuit configured to wirelessly transmit the wireless packet generated by the controller to a further wireless communication device with which the wireless communication device establishes a wireless connection,
wherein, when one of a current video output format and a current audio output format included in the packet received by the wire communication circuit is different from corresponding one of a prior video output format and a prior audio output format included in a packet received prior to a receiving timing of the received packet, the controller generates a wireless packet including corresponding one of the current video output format and the current audio output format, and
wherein, when the video output format and the audio output format included in the packet received by the wire communication circuit are the same as the prior video output format and the prior audio output format, respectively, the controller does not generate any wireless packet;
wherein, upon receiving a second message signal including a CEC (Consumer Electronics Control) message compliant with an HDMI (High-Definition Multimedia Interface) standard from the wire transmission line, the controller divides the CEC message into a plurality of groups and wirelessly transmits the groups.

2. The wireless communication device as claimed in claim 1, wherein the controller sets a message length of a first group of the plurality of divided groups to a longest message length.

3. The wireless communication device as claimed in claim 1,
wherein, upon receiving a second message signal including a CEC message compliant with an HDMI standard from the wire transmission line,
when a message length of the CEC message is equal to or smaller than 6 octets, the controller wirelessly transmits the CEC message without dividing the CEC message,
when the message length of the CEC message is equal to or larger than 7 octets and equal to or smaller than 11 octets, the controller divides the CEC message into a group including a first 6 octets part thereof and a group including a remaining part thereof, and wirelessly transmits the groups, and
when the message length of the CEC message is equal to or larger than 12 octets, the controller divides the CEC message into a group including a first 6 octets part thereof, a group including a next 5 octets part thereof, and a group including a remaining part thereof, and wirelessly transmits the groups.

4. A wireless communication device comprising:
a wireless communication circuit configured to receive a wireless packet from a further wireless communication apparatus;
a controller configured to generate a packet; and
a wire communication circuit configured to periodically transmit the packet generated by the controller to a wire receiver device,
wherein, when the wireless packet received by the wireless communication circuit includes one of a video output format and an audio output format, the controller generates a first packet to be transmitted to a wire receiver device, the first packet including the one of the video output format and the audio output format, and
wherein, when the wireless communication circuit does not receive the wireless packet at a predetermined timing, the controller generates again a second packet to be transmitted to the wire receiver device, the second packet including the one of the video output format and the audio output format which are included in a wireless packet received prior to the timing,
wherein, upon receiving a second message signal including a CEC message compliant with an HDMI standard from the wire transmission line, the controller divides the CEC message into a plurality of groups and wirelessly transmits the groups.

5. The wireless communication device as claimed in claim 4, wherein the controller sets a message length of a first group of the plurality of divided groups to a longest message length.

6. The wireless communication device as claimed in claim 4,
wherein, upon receiving a second message signal including a CEC message compliant with an HDMI standard from the wire transmission line,
when a message length of the CEC message is equal to or smaller than 6 octets, the controller wirelessly transmits the CEC message without dividing the CEC message,
when the message length of the CEC message is equal to or larger than 7 octets and equal to or smaller than 11 octets, the controller divides the CEC message into a group including a first 6 octets part thereof and a group including a remaining part thereof, and wirelessly transmits the groups, and
when the message length of the CEC message is equal to or larger than 12 octets, the controller divides the CEC message into a group including a first 6 octets part thereof, a group including a next 5 octets part thereof, and a group including a remaining part thereof, and wirelessly transmits the groups.

* * * * *